(12) United States Patent
Marutani et al.

(10) Patent No.: US 7,942,187 B2
(45) Date of Patent: May 17, 2011

(54) METHOD FOR MANUFACTURING MOLD

(75) Inventors: Yoji Marutani, Osaka (JP); Minoru Tomita, Naruto (JP); Hisaaki Hashimoto, Naruto (JP); Tomohide Koizumi, Naruto (JP); Kazuhiko Tamagawa, Naruto (JP); Akira Ookubo, Naruto (JP); Nozomu Hashimoto, Naruto (JP)

(73) Assignee: Tomita Pharmaceutical Co., Ltd., Naruto-shi (JP)

( * ) Notice: Subject to any disclaimer, the term of this patent is extended or adjusted under 35 U.S.C. 154(b) by 370 days.

(21) Appl. No.: 12/159,358

(22) PCT Filed: Dec. 19, 2006

(86) PCT No.: PCT/JP2006/325293
§ 371 (c)(1),
(2), (4) Date: Jun. 26, 2008

(87) PCT Pub. No.: WO2007/077731
PCT Pub. Date: Jul. 12, 2007

(65) Prior Publication Data
US 2009/0008055 A1    Jan. 8, 2009

(30) Foreign Application Priority Data
Dec. 27, 2005    (JP) .................................. 2005-375575

(51) Int. Cl.
*B22C 3/00*    (2006.01)
*B22D 46/00*    (2006.01)

(52) U.S. Cl. .......................................... 164/4.1; 164/24

(58) Field of Classification Search ................... 164/4.1, 164/24
See application file for complete search history.

(56) References Cited

U.S. PATENT DOCUMENTS
2004/0138336 A1    7/2004    Bredt et al.

FOREIGN PATENT DOCUMENTS
| JP | 2004-82206 | 3/2004 |
| JP | 2004-508941 | 3/2004 |
| WO | 0134371 A2 | 5/2001 |
| WO | 2004028787 A1 | 4/2004 |

OTHER PUBLICATIONS

Supplementary European Search Report for related European Application No. 06 84 2897.8 (mailed Oct. 11, 2010).

*Primary Examiner* — Kuang Lin
(74) *Attorney, Agent, or Firm* — Day Pitney LLP

(57)    ABSTRACT

A method for manufacturing a mold, including steps of (a) expanding a powder mixture containing a water-soluble inorganic salt powder and a water-soluble organic polymer powder in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region, (b) further expanding the powder mixture on the powder mixture layer after spraying and then selectively spraying the spray liquid through the nozzle on this powder mixture layer, (c) repeatedly conducting the step (b) over several times to form a mold shaped by the sprayed regions, and (d) taking out the mold.

19 Claims, 2 Drawing Sheets

METHOD FOR MANUFACTURING MOLD

PRIORITY

This application is a U.S. national phase application under 35 USC 371 of International Application PCT/JP2006/325293 (not published in English), filed Dec. 19, 2006, which claims priority from 2005-375575 filed in Japan on Dec. 27, 2005, both references of which are incorporated in their entireties.

FIELD OF THE INVENTION

The present invention relates to a method for manufacturing a mold, and in particular to a method for manufacturing a mold by a laminated mold-making technique in which a mold such as a core used in production of a casting mold is automatically produced on the basis of computer data.

BACKGROUND OF THE INVENTION

This kind of laminated mold-making technique is a method of manufacturing a mold such as a core from computer data, for example CAD data, wherein a mold of complicated shape can be produced in a simple process.

Jpn. Pat. Appln. KOKAI Publication No. 2004-82206 discloses a method for manufacturing a mold by utilizing a laminated mold-making technique, wherein a water-soluble powder (for example, a salt powder) expanded in a plane is printed (sprayed through a nozzle) with a liquid (for example, an aqueous solution containing an adhesive substance such as gum arabic or starch) on the basis of CAD data by a three-dimensional printer having a nozzle, to make the bonding strength among particles of the salt powder in the sprayed region higher than that among particles of the salt powder in the unsprayed region, and then further expanding the salt powder thereon and similarly spraying the aqueous solution containing an adhesive substance thereon through the nozzle, is conducted repeatedly a desired number of times. This process is advantageous in that because the resulting mold is made of a water-soluble salt powder, the mold can be easily dissolved (removed) with water after casting.

However, the spray liquid contains an adhesive substance (for example, gum arabic, starch, etc.) and is highly viscous, so a nozzle may be clogged with the spray liquid when sprayed several times from a three-dimensional printer having a nozzle in producing a mold. When the viscosity of the spray liquid is reduced by decreasing the amount of the adhesive substance therein in order to prevent the clogging of the nozzle, the bonding strength among particles of the salt powder in the sprayed region may be reduced to cause collapse of the mold upon removal.

DISCLOSURE OF INVENTION

An object of the present invention is to provide a method for manufacturing a mold, wherein a mold of a desired shape with sufficient strength can be produced reproducibly without nozzle clogging upon spraying with a spray liquid through a nozzle and can be easily removed.

Another object of the present invention is to provide a method for manufacturing a mold, wherein a mold of a desired shape with a smooth surface and higher strength can be produced reproducibly without nozzle clogging upon spraying with a spray liquid through a nozzle and can be easily removed.

According to a first aspect of the present invention, there is provided a method for manufacturing a mold, comprising steps of (a) expanding a powder mixture containing a water-soluble inorganic salt powder and a water-soluble organic polymer powder in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region; (b) further expanding the powder mixture on the powder mixture layer after spraying and then selectively spraying the spray liquid through the nozzle on this powder mixture layer; (c) repeatedly conducting the step (b) over several times to form a mold shaped by the sprayed regions; and (d) taking out the mold.

According to a second aspect of the present invention, there is provided a method for manufacturing a mold, comprising steps of (a) expanding a powder mixture containing a water-soluble first inorganic salt powder, a second inorganic salt powder consisting of magnesium sulfate, and a water-soluble organic polymer powder in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region; (b) further expanding the powder mixture on the powder mixture layer after spraying and then selectively spraying the spray liquid through the nozzle on this powder mixture layer; (c) repeatedly conducting the step (b) over several times to form a mold shaped by the sprayed regions; (d) taking out the mold; and (e) heating the mold at a temperature between the temperature at which the water-soluble organic polymer is burned out and the temperature at which the first and second inorganic salts are not fused.

According to a third aspect of the present invention, there is provided a method for manufacturing a mold, comprising steps of (a) expanding a powder mixture containing a water-soluble first inorganic salt powder, a water-soluble second inorganic salt powder having a melting point lower than that of the first inorganic salt, and a water-soluble organic polymer powder in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region; (b) further expanding the powder mixture on the powder mixture layer after spraying and then selectively spraying the spray liquid through the nozzle on this powder mixture layer; (c) repeatedly conducting the step (b) over several times to form a mold shaped by the sprayed regions; (d) taking out the mold; and (e) heating the mold at a temperature at which the first inorganic salt is not fused but the second inorganic salt is fused.

According to a fourth aspect of the present invention, there is provided a method for manufacturing a mold, comprising steps of (a) expanding a powder mixture containing a water-soluble first inorganic salt powder and a water-soluble organic polymer powder in a plane on a table and then selectively spraying a spray liquid containing a second inorganic salt having a melting point lower than that of the first inorganic salt, and either water or water and a water-miscible organic solvent through a nozzle on this powder mixture layer to make a bonding strength among particles of the powder mixture in a sprayed region higher than that among particles of the powder mixture in an unsprayed region; (b) further expanding the powder mixture on the powder mixture layer after spraying and then selectively spraying the spray liquid through the nozzle on this powder mixture layer; (c) repeatedly conducting the step (b) over several times to form a mold shaped by the sprayed regions; (d) taking out the mold; and (e) heating the mold at a temperature at which the first inorganic salt is not fused but the second inorganic salt is fused.

According to a fifth aspect of the present invention, there is provided a method for manufacturing a mold, comprising steps of (a) expanding a powder mixture containing a water-soluble first inorganic salt powder and an organic polymer powder in a plane on a table and then selectively spraying a spray liquid containing at least one second inorganic salt having a melting point lower than that of the first inorganic salt and selected from calcium chloride and sodium iodide and at least one organic solvent selected from a lower alcohol and a ketone through a nozzle on this powder mixture layer to make a bonding strength among particles of the powder mixture in a sprayed region higher than that among particles of the powder mixture in an unsprayed region; (b) further expanding the powder mixture on the powder mixture layer after spraying and then selectively spraying the spray liquid through the nozzle on this powder mixture layer; (c) repeatedly conducting the step (b) over several times to form a mold shaped by the sprayed regions; (d) taking out the mold; and (e) heating the mold at a temperature at which the first inorganic salt is not fused but the second inorganic salt is fused.

According to a sixth aspect of the present invention, there is provided a method for manufacturing a mold, comprising steps of (a) expanding a powder mixture containing a water-soluble first inorganic salt powder and a water-soluble organic polymer powder in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region; (b) further expanding the powder mixture on the powder mixture layer after spraying and then selectively spraying the spray liquid through the nozzle on this powder mixture layer; (c) repeatedly conducting the step (b) over several times to form a mold shaped by the sprayed regions; (d) taking out the mold; and (e) further spraying a treatment composition containing a water-soluble second inorganic salt having a melting point lower than that of the first inorganic salt and at least one liquid selected from water and a water-miscible organic solvent on a surface of the mold, or dipping the mold in the treatment composition, and then heating the mold after either treatment at a temperature at which the first inorganic salt is not fused but the second inorganic salt is fused.

DETAILED DESCRIPTION

Figure 1:
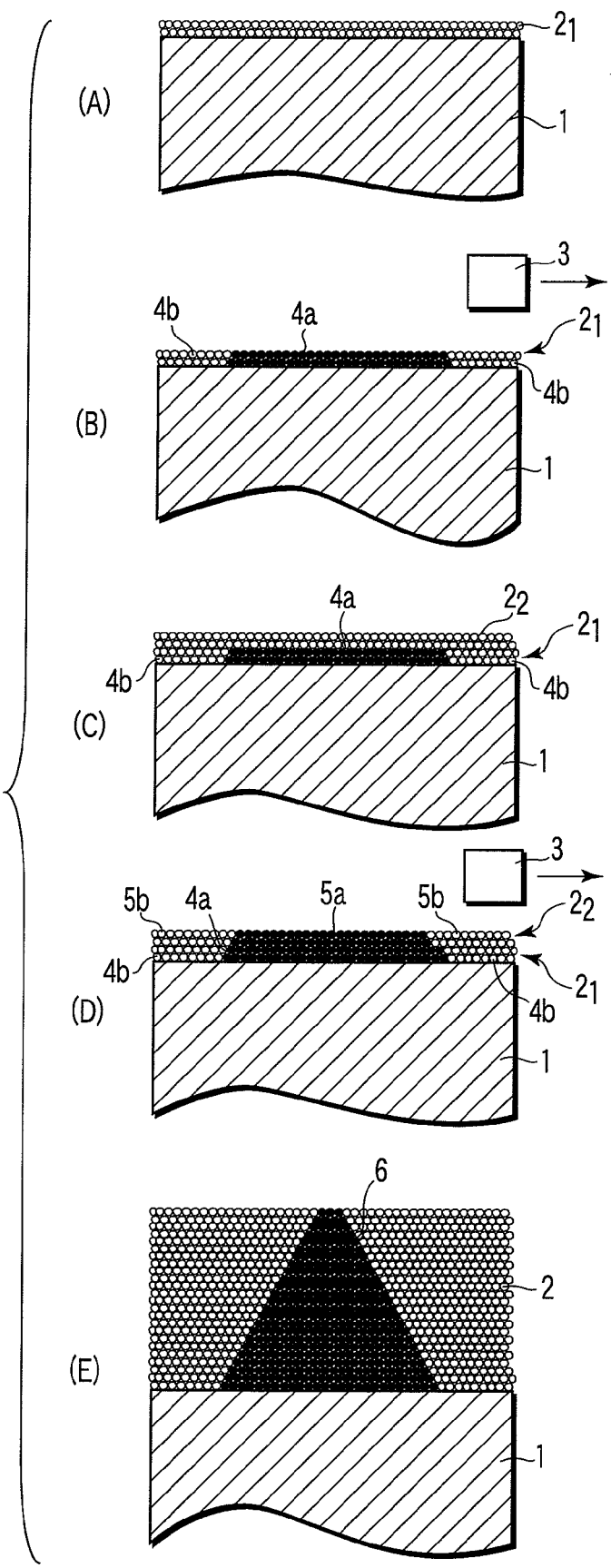
FIG. 1 is a schematic sectional view showing a method for manufacturing a mold according to a first embodiment of the invention.

Hereinafter, the process for producing a mold according to the present invention will be described in detail.

First Embodiment

First Step

A powder mixture containing a water-soluble inorganic salt powder and a water-soluble organic polymer powder is expanded in a plane on a table. Then, the expanded powder mixture layer is sprayed selectively through a nozzle with a spray liquid containing at least one selected from a water-miscible organic solvent and water. At this time, the organic polymer powder acting as a binder is contained in the powder mixture, thus making the bonding strength among particles of the powder mixture in the sprayed region higher than that among particles of the powder mixture in the unsprayed region.

The water-soluble inorganic salt powder is contained as the main component in the powder mixture, that is, in an amount exceeding 50% by weight, particularly preferably in an amount of 70% by weight or more.

The water-soluble inorganic salt can be used, for example, an alkali metal salt and an alkaline earth metal salt. The alkali metal salt is for example an alkali metal halide selected from sodium chloride, potassium chloride, sodium iodide and sodium bromide. The alkaline earth metal salt is for example an alkaline earth metal halide selected from calcium chloride and magnesium chloride. These inorganic salts can be used in the form of a mixture of two or more thereof.

The water-soluble inorganic salt powder desirably has an average particle size of 350 μm or less, more preferably 30 to 150 μm.

As the water-soluble organic polymer, various kinds of organic polymers may be used. An example of such an organic polymer is at least one selected from cellulose derivatives such as polyvinyl pyrrolidone (PVP), polyvinyl alcohol (PVA), polyethylene glycol (PEG), methyl cellulose, ethyl cellulose, ethylhydroxymethyl cellulose, carboxymethyl cellulose (CMC), hydroxypropyl cellulose (HPC) and hydroxypropylmethyl cellulose (HPMC), gum arabic, gelatin, starch and flour. Among these water-soluble organic polymers, PVP, PVA and PEG are preferable because they have dispersibility to prevent agglomeration of the coexisting water-soluble inorganic salt powder, have characteristics to improve fluidity, and can improve the ability of the powder mixture to expanded in a plane. Particularly, PVP is preferable because it is most excellent in an effect of improving the dispersibility and fluidity of the inorganic salt powder.

The water-soluble organic polymer powder desirably has an average particle size of 350 μm or less, more preferably 30 to 150 μm. The water-soluble organic polymer powder having an average particle size larger than that of the inorganic salt powder is preferably selected, because of improving the ability of the powder mixture to be uniformly mixed.

The content of the water-soluble organic polymer powder in the powder mixture is preferably 0.1 to 30% by weight. When the content of the water-soluble organic polymer powder is less than 0.1% by weight, the shape of the resulting mold cannot be maintained, and the resulting mold may easily collapse. On the other hand, when the content of the water-soluble organic polymer powder exceeds 30% by weight, the resulting mold has an increased amount of the water-soluble organic polymer, and when used as a core for casting, may reduce the heat resistance relatively and simultaneously increase the degree of shrinkage to make it difficult to obtain a high-precision casting. The content of the water-soluble organic polymer powder is more preferably 0.5 to 15% by weight.

The water-miscible organic solvent contained in the spray liquid has a function to suppress or prevent blurring and diffusion of the sprayed region when the expanded powder mixture layer is sprayed through a nozzle with the spray liquid. Such water-miscible organic solvent can be used, for example, lower alcohols such as ethanol, methanol and propanol, ketones such as acetone, methyl ethyl ketone, methyl propyl ketone and isopropyl methyl ketone, and alkyl acetates such as methyl acetate and ethyl acetate. Among these organic solvents, lower alcohols and acetone are particularly preferable.

When the spray liquid contains a water-miscible organic solvent and water, their mixing ratio (water-miscible organic solvent to water) is preferably 5:95 to 75:25 by weight.

The spray liquid may further contain a dye. By spraying the expanded powder mixture layer through a nozzle with a spray liquid containing such a dye, the sprayed region is colored, and therefore, a) the ability of the sprayed region to be discriminated from the unsprayed region can be improved, b) spraying through a nozzle can be visually observed in a resting state and thus malfunction of the nozzle can be found early, c) the workability in removing the unsprayed region to remove a mold can be improved, and d) the dimensional accuracy of a mold taken out can be improved. A dye may also similarly be incorporated into the spray liquids in the second to fifth embodiments described later.

The spray liquid is used usually at room temperature, but may be heated. For example, when the spray liquid is composed exclusively of water, the spray liquid is preferably heated at 60° C. at maximum. When the spray liquid consists of a mixture of a water-miscible organic solvent and water, the spray liquid is heated preferably up to a temperature lower by about 10° C. than the boiling point of the water-miscible organic solvent. For example, when the water-miscible organic solvent is ethanol, the spray liquid is preferably heated at 60° C. at maximum. When the water-miscible organic solvent is acetone, the spray liquid is preferably heated at 40° C. at maximum.

Second Step

The powder mixture is further expanded on the powder mixture layer after spraying. Then, the spray liquid is sprayed selectively through the nozzle on this expanded powder mixture layer.

Third Step

The second step is conducted repeatedly several times to form a mold shaped by the sprayed regions formed by spraying the spray liquid through the nozzle several times.

In making a laminated mold in the first to third steps, spraying of the spray liquid through a nozzle can be carried out for example by converting data obtained by three-dimensional CAD into data on a section sliced in a desired thickness, printing the expanded powder mixture layer with the spray liquid by a three-dimensional printer having a nozzle, on the basis of the bottom section data, as described above, and printing similarly repeatedly expanded powder mixture layers with the spray liquid respectively on the basis of the data on sections from bottom to top by the three-dimensional printer.

Fourth Step

After the third step, a mold is manufactured by removing the powder mixture in the unsprayed region and taking out the mold.

The production process according to such first embodiment will be described specifically with reference to (A) to (E) of FIG. 1.

As shown in (A) of FIG. 1, a powder mixture containing a water-soluble inorganic salt powder and a water-soluble organic polymer powder is first expanded in a plane on a table 1 to form a powder mixture layer $2_1$. As shown in (B) of FIG. 1, the powder mixture layer $2_1$ is then printed (sprayed through a nozzle) with a spray liquid containing at least one selected from a water-miscible organic solvent and water by a three-dimensional printer 3 having a nozzle, on the basis of the bottom (data on the lowest section) among the section data described above. At this time, the bonding strength among particles of the powder mixture in a sprayed region 4a in the powder mixture layer $2_1$ is made higher than that among particles of the powder mixture in an unsprayed region 4b.

As shown in (C) of FIG. 1, the powder mixture is further expanded on the powder mixture layer $2_1$ after spraying as described above, to form a powder mixture layer $2_2$. As shown in (D) of FIG. 1, this expanded powder mixture layer $2_2$ is then printed (sprayed through a nozzle) with the spray liquid by the three-dimensional printer 3 having a nozzle, on the basis of the section data (data on an upper section next to the bottom). At this time, the bonding strength among particles of the powder mixture in a sprayed region 5a in the powder mixture layer $2_2$ is made higher than that among particles of the powder mixture in an unsprayed region 5b. Simultaneously, the sprayed region 5a is bound to the sprayed region 4a just below the sprayed region 5a.

Then, the steps of (C) and (D) of FIG. 1 described above are repeatedly carried out. In this process, the respective expanded powder mixture layers are printed (sprayed through a nozzle) in series with the spray liquid by the three-dimensional printer having a nozzle, on the basis of the section data (data on the third section and thereafter) described above. In such laminated mold-making, a mold (for example, a pyramidal mold 6) shaped by the sprayed regions formed by spraying the spray liquid several times is produced as shown in (E) of FIG. 1. Thereafter, the powder mixture in the unsprayed region is removed to take out the mold. In this manner, the pyramidal mold is manufactured.

After manufacture of a laminated mold in the first embodiment described above, the mold before taking out may be dried at a temperature of 200° C. or less, and the mold after taking out may be dried at 200° C. or less.

In the first embodiment, the resulting mold may be heat-treated in an oxygen-containing atmosphere, for example in an air atmosphere, at a temperature between the temperature at which the water-soluble organic polymer is burned out (degreased) and the temperature at which the inorganic salt is not fused.

According to the first embodiment described above, the following action and effect are demonstrated.

1) A powder mixture containing a water-soluble inorganic salt powder and a water-soluble organic polymer powder is expanded in a plane on a table, and then the expanded powder mixture layer is sprayed selectively through a nozzle (for example, by printing with a three-dimensional printer having a nozzle) with a spray liquid containing at least one selected from a water-miscible organic solvent and water, whereby all or a part of the water-soluble organic polymer powder as a component of the powder mixture can be dissolved with the spray liquid, thus rendering the bonding strength among particles of the powder mixture in the sprayed region higher than that among particles of the powder mixture in the unsprayed region. Such expanding of the powder mixture and selective spraying with the spray liquid through a nozzle are repeated several times, whereby a mold of a desired shape shaped by the sprayed regions can be formed.

2) The water-soluble organic polymer powder incorporated into the powder mixture acts as a powder binder in the sprayed region, while the spray liquid is a composition containing at least one selected from a water-miscible organic solvent and water and being free of a binder component involved substantially in increasing viscosity, thereby preventing the clogging of a nozzle upon spraying the spray liquid onto the expanded powder mixture layer (by printing with, for example, a three-dimensional printer having a nozzle). As a result, the sprayed regions (slice regions for forming a mold) faithful to the section data into which the three-dimensional CAD data has been sliced can be formed in laminated mold manufacturing. In addition, there is no limitation, attributable to clogging, of the number of laminates in the laminated mold thus produced, and thus a larger mold can be manufactured.

Particularly, by using a spray liquid containing a water-miscible organic solvent, it is possible to suppress or prevent the blurring and diffusion of the sprayed region upon spraying the expanded powder mixture layer selectively through a nozzle with the spray liquid, thus enabling formation of sprayed regions (slice regions for forming a mold) faithful to the section data into which the three-dimensional CAD data has been sliced.

3) In demolding after casting with the mold as a core, the mold is composed mainly of a water-soluble inorganic salt and a water-soluble organic polymer and can thus be easily removed with water.

According to the first embodiment, therefore, there can be provided a method for manufacturing a mold, wherein a mold of a desired shape with sufficient strength can be produced reproducibly without clogging a nozzle in spraying a spray liquid and can be easily removed after casting.

Second Embodiment

First Step

A powder mixture containing a water-soluble first inorganic salt powder, a second inorganic salt powder consisting of magnesium sulfate, and a water-soluble organic polymer powder is expanded in a plane on a table. Then, the expanded powder mixture layer is sprayed selectively through a nozzle with a spray liquid containing at least one selected from a water-miscible organic solvent and water. At this time, the organic polymer powder acting as a binder is contained in the powder mixture, thus making the bonding strength among particles of the powder mixture in the sprayed region higher than that among particles of the powder mixture in the unsprayed region.

The water-soluble first inorganic salt powder and the second inorganic salt powder consisting of magnesium sulfate are contained as the main components in the powder mixture, that is, in an amount exceeding 50% by weight, particularly preferably in an amount of 70% by weight or more.

The first inorganic salt that can be used, for example, alkali metal salts such as sodium chloride and potassium chloride and alkaline earth metal salts (excluding magnesium sulfate) such as calcium chloride, calcium sulfate and magnesium chloride. Particularly, the first inorganic salt is preferably sodium chloride.

The first and second inorganic salt powders desirably have an average particle size of 350 µm or less, more preferably 30 to 150 µm.

The second inorganic salt powder is compounded in an amount of 50% by weight or less based on the first inorganic salt powder. Particularly, the first inorganic salt powder and the second inorganic salt powder are compounded such that the weight ratio of the first inorganic salt powder to second inorganic salt powder is from 99.5:0.5 to 50:50, more preferably from 99.5:0.5 to 90:10.

The water-soluble organic polymer used may be the same as described above in the first embodiment. Among the water-soluble organic polymers, PVP, PVA and PEG have dispersibility to prevent agglomeration of the coexisting water-soluble first and second inorganic salt powders, and have characteristics to improve fluidity and can improve the ability of the powder mixture to expand in a plane. The water-soluble organic polymer powder desirably has an average particle size of 350 µm or less, more preferably 30 to 150 µm. The water-soluble organic polymer powder having an average particle size larger than that of the inorganic salt powder is preferably selected, because of improving the ability of the powder mixture to be uniformly mixed.

The content of the water-soluble organic polymer powder in the powder mixture is desirably as described in the first embodiment, that is, 0.1 to 30% by weight, more preferably 0.5 to 15% by weight.

The water-miscible organic solvent contained in the spray liquid has a function to suppress or prevent blurring and diffusion of the sprayed region when the expanded powder mixture layer is sprayed through a nozzle with the spray liquid, as described in the first embodiment. Such water-miscible organic solvent can be used, for example, lower alcohols such as ethanol, methanol and propanol, ketones such as acetone, methyl ethyl ketone, methyl propyl ketone and isopropyl methyl ketone, and alkyl acetates such as methyl acetate and ethyl acetate. Among these organic solvents, lower alcohols and acetone are particularly preferable.

When the spray liquid contains a water-miscible organic solvent and water, their mixing ratio (water-miscible organic solvent to water) is preferably 5:95 to 75:25 by weight.

The spray liquid is used usually at room temperature, but may be heated. For example, when the spray liquid consists exclusively of water, the spray liquid is preferably heated at 60° C. at maximum. When the spray liquid consists of a mixture of a water-miscible organic solvent and water, the spray liquid is heated preferably up to a temperature lower by about 10° C. than the boiling point of the water-miscible organic solvent. For example, when the water-miscible organic solvent is ethanol, the spray liquid is preferably heated at 60° C. at maximum. When the water-miscible organic solvent is acetone, the spray liquid is preferably heated at 40° C. at maximum.

Second Step

The powder mixture is further expanded on the powder mixture layer after spraying. Then, the spray liquid is sprayed selectively through the nozzle on this expanded powder mixture layer.

Third Step

The second step is conducted repeatedly several times to form a mold shaped by the sprayed regions formed by spraying the spray liquid through the nozzle several times.

In making a laminated mold in the first to third steps, the spray liquid is sprayed through a nozzle in the same manner as described in the first embodiment.

Fourth Step

After the third step, a mold is produced by removing the powder mixture in the unsprayed region and taking out the mold.

Fifth Step

The final mold is produced by heating the resulting mold in an oxygen-containing atmosphere, for example in an air atmosphere, at a temperature between the temperature at which the water-soluble organic polymer is burned out and the temperature at which the first and second inorganic salts are not fused.

The heating is carried out preferably at 400 to 700° C. in an oxygen-containing atmosphere, for example in an air atmosphere, for example in the case of a combination wherein the first inorganic salt is sodium chloride and the second inorganic salt is magnesium sulfate.

Production of a laminated mold in the method for manufacturing a mold according to the second embodiment is carried out specifically in the same manner as in the steps of (A) to (E) of FIG. 1 described above in the first embodiment except that the powder mixture used is a composition containing the water-soluble first inorganic salt powder, the second inorganic salt powder consisting of magnesium sulfate, and the water-soluble organic polymer powder.

After manufacture of a laminated mold in the second embodiment described above, the mold before taking out may be dried at a temperature of 200° C. or less, and the mold after taking out may be dried at 200° C. or less.

In the second embodiment, the surface of the mold after the fifth step may be sprayed with a treatment composition containing a third inorganic salt having a melting point lower than that of the first inorganic salt and at least one liquid selected from water and a water-miscible organic solvent, or the mold may be dipped in the treatment composition, and the mold after either treatment may be heat-treated at a temperature at which the first and second inorganic salts are not fused but the third inorganic salt is fused.

The treatment composition is mainly in the form of a solution. The concentration of the third inorganic salt in this treatment composition is preferably in the range of 0.1 to 25% by weight. However, the treatment composition consisting of the third inorganic salt combined with the water-miscible organic solvent is sometimes in the form of a slurry in which the third inorganic salt is suspended without dissolution in the water-miscible organic solvent, depending on their types.

The third inorganic salt is selected from different kinds of materials from the first and second inorganic salt. For example, when the first inorganic salt is NaCl, the third inorganic salt can be used KCl, NaI or $CaCl_2$.

In dipping the mold in the treatment composition, the treatment composition on the surface of the mold is preferably 20 to 50 μm in thickness.

By fusing the third inorganic salt in the heat treatment described above, it is possible to further improve the strength of the mold, in addition to an improvement in the surface smoothness of the mold.

When the first inorganic salt in the mold is, for example, sodium chloride (the second inorganic salt is magnesium sulfate) and the third inorganic salt in the treatment composition is potassium chloride, the heating is conducted preferably at a temperature of 400 to 700° C. in an oxygen-containing atmosphere, for example in an air atmosphere. In the case of a combination wherein the first inorganic salt is NaCl (the second inorganic salt is magnesium sulfate) and the third inorganic salt is NaI, the heating is conducted preferably at a temperature of 400 to 700° C. in an oxygen-containing atmosphere, for example in an air atmosphere.

According to the second embodiment described above, the following action and effect are demonstrated.

1) A powder mixture containing a water-soluble first inorganic salt powder, a second inorganic salt powder consisting of magnesium sulfate, and a water-soluble organic polymer powder is expanded in a plane on a table, and then the expanded powder mixture layer is sprayed selectively through a nozzle with a spray liquid containing at least one selected from a water-miscible organic solvent and water (for example, by printing with a three-dimensional printer having a nozzle), whereby all or a part of the water-soluble organic polymer powder as a component of the powder mixture can be dissolved with the spray liquid, thus rendering the bonding strength among particles of the powder mixture in the sprayed region higher than that among particles of the powder mixture in the unsprayed region. Such expanding of the powder mixture and selective spraying of the spray liquid through a nozzle are repeated several times, whereby a mold of a desired shape shaped by the sprayed regions can be formed.

2) The water-soluble organic polymer powder incorporated into the powder mixture acts as a powder binder in the sprayed region, while the spray liquid is a composition containing at least one selected from a water-miscible organic solvent and water and being free of a binder component involved substantially in increasing viscosity, thereby preventing the clogging of a nozzle upon spraying the spray liquid onto the expanded powder mixture layer (by printing with, for example, a three-dimensional printer having a nozzle). As a result, the sprayed regions (slice regions for forming a mold) faithful to the section data into which the three-dimensional CAD data has been sliced can be formed in laminated mold manufacturing. In addition, there is no limitation, attributable to clogging, of the number of laminates in the laminated mold produced, and thus a larger mold can be manufactured.

Particularly, by using a spray liquid containing a water-miscible organic solvent, it is possible to suppress or prevent the blurring and diffusion of the sprayed region upon spraying the expanded powder mixture layer through a nozzle with the spray liquid, thus enabling formation of sprayed regions (slice regions for forming a mold) faithful to the section data into which the three-dimensional CAD data has been sliced.

3) The mold after taking out has a desired sharp shape by using magnesium sulfate as the second inorganic salt.

4) The mold after taking out is heated at a temperature between the temperature at which the water-soluble organic polymer is burned out and the temperature at which the first and second inorganic salts are not fused, whereby the water-soluble organic polymer can be removed.

5) In removal of the mold as a core after casting, the mold is composed mainly of the water-soluble first and second inorganic salts, so the mold can be easily removed with water.

According to the second embodiment, there can be provided a method for manufacturing a mold, wherein a mold having a smooth and glossy surface and practically durable strength and being faithful to three-dimensional CAD data, can be manufactured reproducibly without clogging a nozzle in spraying the spray liquid, and can be easily removed.

According to the second embodiment, the water-soluble organic polymer is burned out by heating, and thus the resulting mold has a slightly lower strength than that of the mold having the remaining water-soluble organic polymer according to the first embodiment, but has the following effect.

That is, when the mold having the remaining water-soluble organic polymer is applied to a core where a molten metal is cast at a temperature higher than the temperature at which the water-soluble organic polymer is burned out, for example, to a core for aluminum die-casting, a gas is generated when the water-soluble organic polymer is burned out. This gas generation causes die-casting to generate bubbles, which reduce the strength, resulting in a defective product. Accordingly, the water-soluble organic polymer in the mold is burned out by the heating, thereby preventing gas generation attributable to the water-soluble organic polymer. As a result, bubble generation, etc. in the die-casting product, accompanying the gas generation, can be prevented, and the desired die-casting product can be obtained.

The surface of the mold after the heating is further sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heated at a temperature at which the first and second inorganic salts are not fused but the third inorganic salt is fused. By coating the surface of the mold with the third inorganic salt in the treatment composition and subsequent heating, the surface of the mold is smoothened by coating the surface with a thin film of the third inorganic salt. In addition, the mold is densified by fusing the third inorganic salt.

When such a mold having a smooth surface is applied to a core for aluminum die-casting, gas generation attributable to the water-soluble organic polymer can be avoided, thereby preventing bubble generation in the die-casting product, as described above, and the contact surface of the die-casting product with the mold (core) can be made glossy, and thus a high-grade die-casting product having the desired strength can be obtained.

Third Embodiment

First Step

A powder mixture containing a water-soluble first inorganic salt powder, a water-soluble second inorganic salt powder having a melting point lower than the first inorganic salt powder, and a water-soluble organic polymer powder is expanded in a plane on a table. Then, the expanded powder mixture layer is sprayed selectively through a nozzle with a spray liquid containing at least one selected from a water-miscible organic solvent and water. At this time, the organic polymer powder acting as a binder is contained in the powder mixture, thus making the bonding strength among particles of the powder mixture in the sprayed region higher than that among particles of the powder mixture in the unsprayed region.

The water-soluble first and second inorganic salt powders are contained as the main components in the powder mixture, that is, in an amount exceeding 50% by weight, particularly preferably in an amount of 70% by weight or more.

The first inorganic salt and second inorganic salt may be, for example, an alkali metal salt or an alkaline earth metal salt, and can be used, for example, in any of the following combinations:

(1) a combination wherein the first inorganic salt is sodium chloride, and second inorganic salt is potassium chloride, (2) a combination wherein the first inorganic salt is sodium chloride, and second inorganic salt is calcium chloride, (3) a combination wherein the first inorganic salt is sodium chloride, and second inorganic salt is magnesium chloride, and (4) a combination wherein the first inorganic salt is sodium chloride, and second inorganic salt is calcium sulfate.

The first and second inorganic salt powders desirably have an average particle size of 350 µm or less, more preferably 30 to 150 µm.

The first inorganic salt powder is compounded preferably in an amount equal to, or more than, the amount of the second inorganic salt powder. Specifically, the first inorganic salt powder and the second inorganic salt powder are preferably compounded such that the weight ratio of the first inorganic salt powder to second inorganic salt powder is from 99.5:0.5 to 50:50.

The water-soluble organic polymer used may be the same as described above in the first embodiment. Among the water-soluble organic polymers, PVP, PVA and PEG have dispersibility to prevent agglomeration of the coexisting water-soluble first and second inorganic salt powders, have characteristics to improve fluidity and can improve the ability of the powder mixture to expand in a plane. The water-soluble organic polymer powder desirably has an average particle size of 350 µm or less, more preferably 30 to 150 µm. The water-soluble organic polymer powder having an average particle size larger than that of the inorganic salt powder is preferably selected, because of improving the ability of the powder mixture to be uniformly mixed.

The content of the water-soluble organic polymer powder in the powder mixture is desirably as described in the first embodiment, that is, 0.1 to 30% by weight, more preferably 0.5 to 15% by weight.

The water-miscible organic solvent contained in the spray liquid has a function to suppress or prevent blurring and diffusion of a sprayed region upon spraying the spray liquid through a nozzle onto the expanded powder mixture layer, as described in the first embodiment. Such water-miscible organic solvent that can be used includes, for example, lower alcohols such as ethanol, methanol and propanol, ketones such as acetone, methyl ethyl ketone, methyl propyl ketone and isopropyl methyl ketone, and alkyl acetates such as methyl acetate and ethyl acetate. Among these organic solvents, lower alcohols and acetone are particularly preferable.

When the spray liquid contains a water-miscible organic solvent and water, their mixing ratio (water-miscible organic solvent to water) is preferably 5:95 to 75:25 by weight.

The spray liquid is used usually at room temperature, but may be heated. For example, when the spray liquid consists exclusively of water, the spray liquid is preferably heated at 60° C. at maximum. When the spray liquid consists of a mixture of a water-miscible organic solvent and water, the spray liquid is heated preferably up to a temperature lower by about 10° C. than the boiling point of the water-miscible organic solvent. For example, when the water-miscible organic solvent is ethanol, the spray liquid is preferably heated at 60° C. at maximum. When the water-miscible organic solvent is acetone, the spray liquid is preferably heated at 40° C. at maximum.

Second Step

The powder mixture is further expanded on the powder mixture layer after spraying. Then, the spray liquid is sprayed selectively through the nozzle on this expanded powder mixture layer.

Third Step

The second step is conducted repeatedly several times to form a mold shaped by the sprayed regions formed by spraying the spray liquid through the nozzle several times.

In making a laminated mold in the first to third steps, the spray liquid is sprayed through a nozzle in the same manner as described in the first embodiment.

Fourth Step

After the third step, a mold is manufactured by removing the powder mixture in the unsprayed region and taking out the mold.

Fifth Step

The resulting mold is heated in an oxygen-containing atmosphere, for example in an air atmosphere, at a temperature at which the first inorganic salt is not fused but the second inorganic salt is fused, whereby the final mold is manufactured. At this time, the water-soluble organic polymer in the mold is burned out (degreased).

In the case of the combination where the first inorganic salt is sodium chloride and the second inorganic salt is potassium chloride, the heating is conducted preferably at a temperature of 400 to 750° C. in an oxygen-containing atmosphere, for example in an air atmosphere.

Production of a laminated mold in the method for manufacturing a mold according to the third embodiment is carried out specifically in the same manner as in the steps of (A) to (E) of FIG. 1 described above in the first embodiment except that the powder mixture used is a composition containing the water-soluble first inorganic salt powder, the water-soluble second inorganic salt powder having a melting point lower than that of the first inorganic salt, and the water-soluble organic polymer powder.

After manufacture of a laminated mold in the third embodiment described above, the mold before taking out may be dried at a temperature of 200° C. or less, and the mold after taking out may be dried at 200° C. or less.

In the third embodiment, the surface of the mold after the fifth step may be sprayed with a treatment composition containing a third inorganic salt having a melting point lower than that of the first inorganic salt and at least one liquid selected from water and a water-miscible organic solvent, or the mold may be dipped in the treatment composition, and the mold after either treatment may be heated at a temperature at which the first inorganic salt is not fused but at least one inorganic salt selected from the second and third inorganic salts is fused.

The treatment composition is mainly in the form of a solution. The concentration of the third inorganic salt in this treatment composition is preferably in the range of 0.1 to 25% by weight. However, the treatment composition consisting of the third inorganic salt combined with the water-miscible organic solvent is sometimes in the form of a slurry in which the third inorganic salt is suspended without dissolution in the water-miscible organic solvent, depending on their types.

The third inorganic salt is selected from materials of the same type as, or of a different type from, that of the second inorganic salt. When the third inorganic salt is a material of a different type from the first and second inorganic salts, the combination of the first, second and third inorganic salts include, for example, a combination wherein the first inorganic salt is NaCl, the second inorganic salt is KCl, and the third inorganic salt is NaI or $CaCl_2$.

In dipping the mold in the treatment composition, the treatment composition on the surface of the mold is preferably 20 to 50 μm in thickness.

The "fusion" of at least one inorganic salt selected from the second inorganic salt and the third inorganic salt in the heating means that when the second and third inorganic salts are of the same type, the inorganic salts are simply fused. When the third inorganic salt is a material of a type different from the second inorganic salt, the term "fusion" means (A) mere fusion of the second inorganic salt and/or the third inorganic salt, (B) formation of a solid solution of all of the second and third inorganic salts upon fusion, (C) formation of a solid solution of some of the second and third inorganic salts and simultaneous formation of a composite salt between the remaining inorganic salts upon fusion, and (D) formation of a composite salt of all the second and third inorganic salts upon fusion. By fusing at least one inorganic salt selected from the second and third inorganic salts in this way, it is possible to further improve the strength of the mold, in addition to an improvement in the surface smoothness of the mold.

When the third inorganic salt in the treatment composition is potassium chloride in a combination wherein the first inorganic salt in the mold is, for example, sodium chloride and the second inorganic salt is potassium chloride, the heating is conducted preferably at a temperature of 400 to 750° C. in an oxygen-containing atmosphere, for example in an air atmosphere. In the case of a combination wherein the first inorganic salt is NaCl, the second inorganic salt is KCl, and the third inorganic salt is NaI the heating is conducted preferably at a temperature of 400 to 700° C. in an oxygen-containing atmosphere, for example, in an air atmosphere.

According to the third embodiment described above, the following action and effect are demonstrated.

1) A powder mixture containing a water-soluble first inorganic salt powder, a water-soluble second inorganic salt powder having a melting point lower than the first inorganic salt powder, and a water-soluble organic polymer powder is expanded in a plane on a table, and then the expanded powder mixture layer is sprayed selectively through a nozzle with a spray liquid containing at least one selected from a water-miscible organic solvent and water (for example, by printing with a three-dimensional printer having a nozzle), whereby all or a part of the water-soluble organic polymer powder as a component of the powder mixture can be dissolved with the spray liquid, thus rendering the bonding strength among particles of the powder mixture in the sprayed region higher than that among particles of the powder mixture in the unsprayed region. Such expanding of the powder mixture and selective spraying of the spray liquid through a nozzle are repeated several times, whereby a mold of a desired shape shaped by the sprayed regions can be formed.

2) The water-soluble organic polymer powder incorporated into the powder mixture acts as a powder binder in the sprayed region, while the spray liquid is a composition containing at least one selected from a water-miscible organic solvent and water and being free of a binder component involved substantially in increasing viscosity, thereby preventing the clogging of a nozzle upon spraying the spray liquid onto the expanded powder mixture layer (by printing with, for example, a three-dimensional printer having a nozzle). As a result, the sprayed regions (slice regions for forming a mold) faithful to the section data into which the three-dimensional CAD data has been sliced can be formed in laminated mold manufacturing. In addition, there is no limitation, attributable to clogging, of the number of laminates in the laminated mold thus produced, and thus a larger mold can be manufactured.

Particularly, by using a spray liquid containing a water-miscible organic solvent, it is possible to suppress or prevent the blurring and diffusion of the sprayed region upon spraying the expanded powder mixture layer selectively through a nozzle with the spray liquid, thus enabling formation of sprayed regions (slice regions for forming a mold) faithful to the section data into which the three-dimensional CAD data has been sliced.

3) The mold after taking out is heated at a temperature at which the first inorganic salt is not fused but the second inorganic salt is fused, whereby the fused second inorganic salt permeates into minute voids in the first inorganic salt powder to make the mold dense. By fusing the second inorganic salt on the surface of the mold, the surface can be smoothened. As a result, a mold having a glossier surface than the mold just after taking out can be obtained.

4) In demolding after casting with the mold as a core, the mold is composed mainly of the water-soluble first and second inorganic salts and can thus be easily removed with water.

According to the third embodiment, there can be provided a method for manufacturing a mold, wherein a mold having a smooth and glossy surface and practically durable strength and being faithful to three-dimensional CAD data can be produced reproducibly without clogging a nozzle in spraying the spray liquid and can be easily removed.

According to the third embodiment, the water-soluble organic polymer is burned out by heating the mold at a temperature at which the second inorganic salt is fused, and thus the resulting mold has a slightly lower strength than that of the mold having the remaining water-soluble organic polymer according to the first embodiment, but has the following effect.

That is, when the mold having the remaining water-soluble organic polymer is applied to a core where a molten metal is cast at a temperature higher than the temperature at which the water-soluble organic polymer is burned out, for example, to a core for aluminum die-casting, a gas is generated when the water-soluble organic polymer is burned out. This gas generation causes die-casting to generate bubbles, which reduce strength, resulting in a defective product. Accordingly, the water-soluble organic polymer in the mold is burned out by the heating, thereby preventing gas generation attributable to the water-soluble organic polymer. As a result, bubble generation, etc. in the die-casting product, accompanying the gas generation, can be prevented, and the die-casting product having a desired strength can be obtained.

The surface of the mold after the heat treatment is further sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused. By coating the surface of the mold with the third inorganic salt in the treatment composition and subsequent heating, the surface of the mold is smoothened by coating it with a thin film of the third inorganic salt. In addition, the mold is densified by fusing at least one of the second and third inorganic salts. Particularly, both the second and third inorganic salts can be fused to form a mutual solid solution or to form a composite salt, thus further densifying the mold and improving the strength thereof. As a result, a high-strength mold having a smoother and glossier surface can be obtained.

When such a mold having a smooth surface is applied, for example, to a core for aluminum die-casting, gas generation attributable to the water-soluble organic polymer can be avoided, thereby preventing bubble generation in the die-casting product, as described above, and the contact surface of the die-casting product with the mold (core) can be made glossy, and thus a high-grade die-casting product having a desired strength can be obtained.

Fourth Embodiment

First Step

A powder mixture containing a water-soluble first inorganic salt powder and a water-soluble organic polymer powder is expanded in a plane on a table. Then, the expanded powder mixture layer is sprayed selectively through a nozzle with a spray liquid containing a water-soluble second inorganic salt having a melting point lower than that of the first inorganic salt and either water or a mixture consisting of water and a water-miscible organic solvent. At this time, the organic polymer powder acting as a binder is contained in the powder mixture, thus making the bonding strength among particles of the powder mixture in the sprayed region higher than that among particles of the powder mixture in the unsprayed region.

The water-soluble first inorganic salt powder is contained as the main component in the powder mixture, that is, in an amount exceeding 50% by weight, particularly preferably in an amount of 70% by weight or more.

The water-soluble first inorganic salt in the powder mixture and the second inorganic salt in the spray liquid are used in, for example, the combinations (1) to (4) described above in the third embodiment.

The first inorganic salt powder desirably has an average particle size of 350 μm or less, more preferably 30 to 150 μm.

The water-soluble organic polymer used may be the same as described above in the first embodiment. Among the water-soluble organic polymers, PVP, PVA and PEG have dispersibility to prevent agglomeration of the coexisting water-soluble first inorganic salt powder, have characteristics to improve fluidity and can improve the ability of the powder mixture to expand in a plane. The water-soluble organic polymer powder desirably has an average particle size of 350 μm or less, more preferably 30 to 150 μm. The water-soluble organic polymer powder having an average particle size larger than that of the inorganic salt powder is preferably selected, because of improving the ability of the powder mixture to be uniformly mixed.

The content of the water-soluble organic polymer powder in the powder mixture is desirably as described in the first embodiment, that is, 0.1 to 30% by weight, more preferably 0.5 to 15% by weight.

The water-miscible organic solvent contained in the spray liquid has a function to suppress or prevent blurring and diffusion of the sprayed region when the expanded powder mixture layer is sprayed through a nozzle with the spray liquid, as described in the first embodiment. Such water-miscible organic solvents that can be used include, for example, lower alcohols such as ethanol, methanol and propanol, ketones such as acetone, methyl ethyl ketone, methyl propyl ketone and isopropyl methyl ketone, and alkyl acetates such as methyl acetate and ethyl acetate. Among these organic solvents, lower alcohols and acetone are particularly preferable.

When the spray liquid contains a water-miscible organic solvent and water, their mixing ratio (water-miscible organic solvent to water) is preferably 5:95 to 75:25 by weight.

The concentration of the second inorganic salt in the spray liquid is preferably 0.1% by weight or more, from the viewpoint of improving the strength of a mold by the second inorganic salt. The upper limit of the concentration of the second inorganic salt in the spray liquid is preferably the maximum concentration of the second inorganic salt that can be dissolved at room temperature in at least one selected from a water-miscible organic solvent and water. Particularly, the concentration of the second inorganic salt in the spray liquid is preferably 0.1 to 25% by weight.

The spray liquid is used usually at room temperature, but may be heated. For example, when the spray liquid consists of the second inorganic salt and water, the spray liquid is preferably heated at 60° C. at maximum. When the spray liquid consists of a mixture of the second inorganic salt, the water-miscible organic solvent and water, the spray liquid is heated preferably up to a temperature lower by about 10° C. than the boiling point of the water-miscible organic solvent. For example, when the water-miscible organic solvent is ethanol, the spray liquid is preferably heated at 60° C. at maximum. When the water-miscible organic solvent is acetone, the spray liquid is preferably heated at 40° C. at maximum.

Second Step

The powder mixture is further expanded on the powder mixture layer after spraying. Then, the spray liquid is sprayed selectively through the nozzle on this expanded powder mixture layer.

Third Step

The second step is conducted repeatedly several times to form a mold shaped by the sprayed regions formed by spraying the spray liquid several times.

In making a laminated mold in the first to third steps, the spray liquid is sprayed through a nozzle in the same manner as described in the first embodiment.

Fourth Step

After the third step, a mold is produced by removing the powder mixture in the unsprayed region and taking out the mold.

Fifth Step

The resulting mold is heated in an oxygen-containing atmosphere, for example in an air atmosphere, at a temperature at which the first inorganic salt is not fused but the second inorganic salt is fused, whereby the final mold is produced. At this time, the water-soluble organic polymer in the mold is burned out (degreased).

In the case of the combination where the first inorganic salt is sodium chloride and the second inorganic salt is potassium chloride, the heating is conducted preferably at a temperature of 400 to 750° C. in an oxygen-containing atmosphere, for example in an air atmosphere.

Production of a laminated mold in the method for manufacturing a mold according to the fourth embodiment is carried out specifically in the same manner as in the steps of (A) to (E) of FIG. 1 described above in the first embodiment except that the powder mixture used contains a water-soluble first inorganic salt powder and a water-soluble organic polymer powder, and the sprayed liquid used contains a second inorganic salt to be fused with the first inorganic salt by heating and either water or a water-miscible organic solvent and water.

After manufacture of a laminated mold in the fourth embodiment described above, the mold before taking out may be dried at a temperature of 200° C. or less, and the mold after taking out may be dried at 200° C. or less.

In the fourth embodiment, the surface of the mold after the fifth step may be sprayed with a treatment composition containing a third inorganic salt having a melting point lower than that of the first inorganic salt and at least one liquid selected from water and a water-miscible organic solvent, or the mold may be dipped in the treatment composition, and the mold after either treatment may be heated at a temperature at which the first inorganic salt is not fused but at least one inorganic salt selected from the second and third inorganic salts is fused.

The treatment composition is mainly in the form of a solution. The concentration of the third inorganic salt in this treatment composition is preferably in the range of 0.1 to 25% by weight. However, the treatment composition consisting of the third inorganic salt combined with the water-miscible organic solvent is sometimes in the form of a slurry in which the third inorganic salt is suspended without dissolution in the water-miscible organic solvent, depending on their types.

The third inorganic salt is selected from materials of the same type as, or of a different type from, that of the second inorganic salt. When the third inorganic salt is a material of a different type from the first and second inorganic salts, the combination of the first, second and third inorganic salts includes, for example, a combination wherein the first inorganic salt is sodium chloride (NaCl), the second inorganic salt is potassium chloride (KCl), and the third inorganic salt is sodium iodide (NaI) or calcium chloride ($CaCl_2$).

In dipping the mold into the treatment composition, the treatment composition on the surface of the mold is preferably 20 to 50 μm in thickness.

The "fusion" of at least one inorganic salt selected from the second inorganic salt and the third inorganic salt in the heating treatment means that when the second and third inorganic salts are of the same type, the inorganic salts are simply fused. When the third inorganic salt is a material of a type different from the second inorganic salt, the term "fusion" means (A) mere fusion of the second inorganic salt and/or the third inorganic salt, (B) formation of a solid solution of all of the second and third inorganic salts upon fusion, (C) formation of a solid solution of some of the second and third inorganic salts and simultaneous formation of a composite salt between the remaining inorganic salts upon fusion, and (D) formation of a composite salt of all the second and third inorganic salts upon fusion. By fusing at least one inorganic salt selected from the second and third inorganic salts in this way, it is possible to further improve the strength of the mold, in addition to an improvement in the surface smoothness of the mold.

When the third inorganic salt in the treatment composition is potassium chloride (KCl) in a combination wherein the first inorganic salt in the mold is for example sodium chloride (NaCl) and the second inorganic salt is potassium chloride (KCl), the heating is conducted preferably at a temperature of 400 to 750° C. in an oxygen-containing atmosphere, for example in an air atmosphere. In the case of a combination wherein the first inorganic salt is sodium chloride (NaCl), the second inorganic salt is potassium chloride (KCl), and the third inorganic salt is sodium iodide (NaI), the heat treatment is conducted preferably at a temperature of 400 to 700° C. in an oxygen-containing atmosphere, for example in an air atmosphere.

According to the fourth embodiment described above, the following action and effect are demonstrated.

1) A powder mixture containing a water-soluble first inorganic salt powder and a water-soluble organic polymer powder is expanded in a plane on a table, and then the expanded powder mixture layer is sprayed selectively through a nozzle (for example, by printing with a three-dimensional printer having a nozzle) with a spray liquid containing a water-soluble second inorganic salt having a melting point lower than that of the first inorganic salt and either water or a mixture consisting of water and a water-miscible organic solvent, whereby all or a part of the water-soluble organic polymer powder as a component of the powder mixture can be dissolved with the spray liquid, thus rendering the bonding strength among particles of the powder mixture in the sprayed region higher than that among particles of the powder mixture in the unsprayed region. Such expanding of the powder mixture and selective spraying with the spray liquid through a nozzle are repeated several times, whereby a mold of a desired shape shaped by the sprayed regions can be formed.

2) The water-soluble organic polymer powder incorporated into the powder mixture acts as a powder binder in the sprayed region, while the spray liquid is a composition containing the second inorganic salt and either water or a mixture consisting of water and a water-miscible organic solvent and being free of a binder component involved substantially in increasing viscosity, thereby preventing the clogging of a nozzle upon spraying the spray liquid onto the expanded powder mixture layer (by printing with, for example, a three-dimensional printer having a nozzle). As a result, the sprayed regions (slice regions for forming a mold) faithful to the section data into which the three-dimensional CAD data has been sliced can be formed in laminated mold manufacturing. In addition, there is no limitation, attributable to clogging, of the number of laminates in the laminated mold thus produced, and thus a larger mold can be manufactured.

Particularly, by using a spray liquid containing a water-miscible organic solvent, it is possible to suppress or prevent the blurring and diffusion of the sprayed region upon spraying the expanded powder mixture layer selectively through a nozzle with the spray liquid, thus enabling formation of sprayed regions (slice regions for forming a mold) faithful to the section data into which the three-dimensional CAD data has been sliced.

3) The mold after taking out is heat-treated at a temperature at which the first inorganic salt is not fused but the second inorganic salt is fused, whereby the fused second inorganic salt permeates into minute voids in the first inorganic salt powder to make the mold dense. By fusing the second inorganic salt on the surface of the mold, the surface can be smoothened. As a result, a mold having a glossier surface than the mold just after removal can be obtained.

4) In demolding after casting with the mold as a core, the mold is composed mainly of the water-soluble first and second inorganic salts and can thus be easily removed with water.

According to the fourth embodiment, there can be provided a method for manufacturing a mold, wherein a mold having a smooth and glossy surface and practically durable strength and being faithful to three-dimensional CAD data can be produced reproducibly without clogging a nozzle in spraying the spray liquid and can be easily removed.

According to the fourth embodiment, the water-soluble organic polymer is burned out by heating at a temperature at which the second inorganic salt is fused, and thus the resulting mold has a slightly lower strength than that of the mold having the remaining water-soluble organic polymer according to the first embodiment, but has the following effect.

That is, when such a mold wherein the water-soluble organic polymer has been burned out by the heating is applied to a core where a molten metal is cast at a temperature higher than the temperature at which the water-soluble organic polymer is burned out, for example, to a core for aluminum die-casting, the gas generation attributable to the water-soluble organic polymer can be prevented, as described in the third embodiment. As a result, bubble generation, etc. in the die-casting product, accompanying the gas generation, can be prevented, and the die-casting product having desired strength can be obtained.

The surface of the mold after the heat treatment is sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused. By coating the surface of the mold with the third inorganic salt in the treatment composition and subsequent heat treatment, the surface of the mold is smoothened by coating it with a thin film of the third inorganic salt. In addition, the mold is densified by fusing at least one of the second and third inorganic salts. Particularly, both the second and third inorganic salts can be fused to form a mutual solid solution or to form a composite salt, thus further densifying the mold and improving the strength thereof. As a result, a high-strength mold having a smoother and glossier surface can be obtained.

When such a mold having a smooth surface is applied to a core for aluminum die-casting, gas generation attributable to the water-soluble organic polymer can be avoided, thereby preventing bubble generation in the die-casting product, as described above, and the contact surface of the die-casting product with the mold (core) can be made glossy, and thus a high-grade die-casting product having desired strength can be obtained.

Fifth Embodiment

A powder mixture containing a water-soluble first inorganic salt powder and a water-soluble organic polymer powder is expanded in a plane on a table. Then, the expanded powder mixture layer is sprayed selectively through a nozzle with a spray liquid containing at least one second inorganic salt having a melting point lower than that of the first inorganic salt and selected from calcium chloride and sodium iodide and at least one organic solvent selected from a lower alcohol and a ketone. At this time, the organic polymer powder acting as a binder is contained in the powder mixture and is dissolved in a specific organic solvent in the sprayed region, thus making the bonding strength among particles of the powder mixture in the sprayed region higher than that among particles of the powder mixture in the unsprayed region.

The water-soluble first inorganic salt powder is contained as the main component in the powder mixture, that is, in an amount exceeding 50% by weight, particularly preferably in an amount of 70% by weight or more.

The first inorganic salt can be used, for example, sodium chloride, sodium bromide, potassium chloride, potassium bromide, magnesium chloride, magnesium sulfate, and the like.

The first inorganic salt powder desirably has an average particle size of 350 µm or less, more preferably 30 to 150 µm.

The organic polymer used may be the same water-soluble organic polymer as described above in the first embodiment.

Among the water-soluble organic polymers, PVP, PVA and PEG have dispersibility to prevent agglomeration of the coexisting first inorganic salt powder, have characteristics to improve fluidity and can improve the ability of the powder mixture to expand in a plane. The organic polymer powder desirably has an average particle size of 350 μm or less, more preferably 30 to 150 μm. The water-soluble organic polymer powder having an average particle size larger than that of the inorganic salt powder is preferably selected, because of improving the ability of the powder mixture to be uniformly mixed.

The content of the organic polymer powder in the powder mixture is desirably as described in the first embodiment, that is, 0.1 to 30% by weight, more preferably 0.5 to 15% by weight.

The second inorganic salt such as sodium iodide contained in the spray liquid is dissolved in a specific organic solvent such as a lower alcohol and dissolved in water as well.

At least one organic solvent selected from lower alcohols and ketones to be contained in the spray liquid has a function to suppress or prevent blurring and diffusion of the sprayed region when the expanded powder mixture layer is sprayed through a nozzle with the spray liquid. The lower alcohols include, for example, ethanol, methanol and propanol. The ketones include, for example, acetone, methyl ethyl ketone, methyl propyl ketone and isopropyl methyl ketone. Among these organic solvents, ethanol and acetone are particularly preferable.

The concentration of the second inorganic salt in the spray liquid is preferably 0.1% by weight or more, from the viewpoint of improving the strength of a mold by the second inorganic salt. The upper limit of the concentration of the second inorganic salt in the spray liquid is preferably the maximum concentration of the second inorganic salt that can be dissolved at room temperature in at least one organic solvent selected from a lower alcohol and a ketone. Particularly, the concentration of the second inorganic salt in the spray liquid is preferably 0.1 to 25% by weight.

Second Step

The powder mixture is further expanded on the powder mixture layer after spraying. Then, the spray liquid is sprayed selectively through the nozzle on this expanded powder mixture layer.

Third Step

The second step is conducted repeatedly several times to form a mold shaped by the sprayed regions formed by spraying the spray liquid several times.

In making a laminated mold in the first to third steps, the spray liquid is sprayed through a nozzle in the same manner as described in the first embodiment.

Fourth Step

After the third step, a mold is produced by removing the powder mixture in the unsprayed region and taking out the mold.

Fifth Step

The resulting mold is heated in an oxygen-containing atmosphere, for example in an air atmosphere, at a temperature at which the first inorganic salt is not fused but the second inorganic salt is fused, whereby the final mold is produced. At this time, the organic polymer in the mold is burned out (degreased).

In the case of the combination where the first inorganic salt is sodium chloride (NaCl) and the second inorganic salt is sodium iodide (NaI), the heating is conducted preferably at a temperature of 400 to 700° C. in an oxygen-containing atmosphere, for example in an air atmosphere.

Production of a laminated mold in the method for manufacturing a mold according to the fifth embodiment is carried out specifically in the same manner as in the steps of (A) to (E) of FIG. 1 described above in the first embodiment, except that the powder mixture used contains a water-soluble first inorganic salt powder and a water-soluble organic polymer powder, and the spray liquid used contains a specific second inorganic salt to be fused with the first inorganic salt by heating and a specific water-miscible organic solvent.

After manufacture of a laminated mold in the fifth embodiment described above, the mold before taking out may be dried at a temperature of 200° C. or less, and the mold after taking out may be dried at 200° C. or less.

In the fifth embodiment, the surface of the mold after the fifth step may be sprayed with a treatment composition containing a third inorganic salt having a melting point lower than that of the first inorganic salt and at least one liquid selected from water and a water-miscible organic solvent, or the mold may be dipped in the treatment composition, and the mold after either treatment may be heated at a temperature at which the first inorganic salt is not fused but at least one inorganic salt selected from the second and third inorganic salts is fused.

The treatment composition is mainly in the form of a solution. The concentration of the third inorganic salt in this treatment composition is preferably in the range of 0.1 to 25% by weight. However, the treatment composition consisting of the third inorganic salt combined with the water-miscible organic solvent is sometimes in the form of a slurry in which the third inorganic salt is suspended without dissolution in the water-miscible organic solvent, depending on their types.

The third inorganic salt is selected from materials of the same type as, or of a different type from, that of the second inorganic salt. When the third inorganic salt is a material of a different type from the first and second inorganic salts, the combination of the first, second and third inorganic salts includes, for example, a combination wherein the first inorganic salt is sodium chloride (NaCl), the second inorganic salt is sodium iodide (NaI) or calcium chloride ($CaCl_2$), and the third inorganic salt is $CaCl_2$ or NaI.

In dipping the mold into the treatment composition, the treatment composition on the surface of the mold is preferably 20 to 50 μm in thickness.

The "fusion" of at least one inorganic salt selected from the second inorganic salt and the third inorganic salt in the heating treatment means that when the second and third inorganic salts are of the same type, the inorganic salts are simply fused. When the third inorganic salt is a material of a type different from the second inorganic salt, the term "fusion" means (A) mere fusion of the second inorganic salt and/or the third inorganic salt, (B) formation of a solid solution of all of the second and third inorganic salts upon fusion, (C) formation of a solid solution of some of the second and third inorganic salts and simultaneous formation of a composite salt between the remaining inorganic salts upon fusion, and (D) formation of a composite salt of all the second and third inorganic salts upon fusion. By fusing at least one inorganic salt selected from the second and third inorganic salts in this way, it is possible to further improve the strength of the mold, in addition to an improvement in the surface smoothness of the mold.

When the third inorganic salt in the treatment composition is calcium chloride ($CaCl_2$) in a combination wherein the first inorganic salt in the mold is, for example, sodium chloride (NaCl) and the second inorganic salt is sodium iodide (NaI), the heating is conducted preferably at a temperature of 400 to 750° C. in an oxygen-containing atmosphere, for example in an air atmosphere.

According to the fifth embodiment described above, the following action and effect are demonstrated.

1) A powder mixture containing a water-soluble first inorganic salt powder and an organic polymer powder is expanded in a plane on a table, and then the expanded powder mixture layer is sprayed selectively through a nozzle with a spray liquid containing a specific second inorganic salt having a melting point lower than that of the first inorganic salt and a specific organic solvent such as a lower alcohol (for example, by printing with a three-dimensional printer having a nozzle), whereby all or a part of the organic polymer powder as a component of the powder mixture can be dissolved with the organic solvent in the spray liquid, thus rendering the bonding strength among particles of the powder mixture in the sprayed region higher than that among particles of the powder mixture in the unsprayed region. Such expanding of the powder mixture and selective spraying of the spray liquid through a nozzle are repeated several times, whereby a mold of a desired shape shaped by the sprayed regions can be formed.

2) The organic polymer powder incorporated into the powder mixture acts as a powder binder in the sprayed region, while the spray liquid is a composition containing a specific second inorganic salt and an organic solvent and being free of a binder component involved substantially in increasing viscosity, thereby preventing the clogging of a nozzle upon spraying the spray liquid onto the expanded powder mixture layer (by printing with, for example, a three-dimensional printer having a nozzle). As a result, the sprayed regions (slice regions for forming a mold) faithful to the section data into which the three-dimensional CAD data has been sliced can be formed in laminated mold manufacturing. In addition, there is no limitation, attributable to clogging, of the number of laminates in the laminated mold thus produced, and thus a larger mold can be manufactured.

3) By using a spray liquid containing a specific organic solvent, it is possible to suppress or prevent the blurring and diffusion of the sprayed region upon spraying the expanded powder mixture layer through a nozzle with the spray liquid, thus enabling formation of sprayed regions (slice regions for forming a mold) faithful to the section data into which the three-dimensional CAD data has been sliced.

4) The mold after taking out is heated at a temperature at which the first inorganic salt is not fused but the second inorganic salt is fused, whereby the fused second inorganic salt permeates into minute voids in the first inorganic salt powder to make the mold dense. By fusing the second inorganic salt on the surface of the mold, the surface can be smoothened. As a result, a mold having a glossier surface than the mold just after removal can be obtained.

5) In demolding after casting with the mold as a core, the mold is composed mainly of the water-soluble first inorganic salt and the water-soluble second inorganic salt such as calcium chloride or sodium iodide and can thus be easily removed with water.

According to the fifth embodiment, there can be provided a method for manufacturing a mold, wherein a mold having a smooth and glossy surface and practically durable strength and being faithful to three-dimensional CAD data can be produced reproducibly without clogging a nozzle in spraying the spray liquid and can be easily removed.

According to the fifth embodiment, the organic polymer is burned out by heating the mold at a temperature at which the second inorganic salt is fused, and thus the resulting mold has a slightly lower strength than that of the mold having the remaining water-soluble organic polymer according to the first embodiment, but has the following effect.

That is, when such a mold wherein the water-soluble organic polymer has been burned out by the heating is applied to a core where a molten metal is cast at a temperature higher than the temperature at which the water-soluble organic polymer is burned out, for example, to a core for aluminum die-casting, the gas generation attributable to the water-soluble organic polymer can be prevented, as described in the third embodiment. As a result, bubble generation, etc. in the die-casting product, accompanying the gas generation, can be prevented, and a die-casting product having the desired strength can be obtained.

The surface of the mold after the heating is sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused. By coating the surface of the mold with the third inorganic salt in the treatment composition and subsequent heating, the surface of the mold is smoothened by coating it with a thin film of the third inorganic salt. In addition, the mold is densified by fusing at least one selected from the second and third inorganic salts. Particularly, both the second and third inorganic salts can be fused to form a mutual solid solution or to form a composite salt, thus further densifying the mold and improving the strength thereof. As a result, a high-strength mold having a smoother and glossier surface can be obtained.

When such a mold having a smooth surface is applied to a core for aluminum die-casting, gas generation attributable to the organic polymer can be avoided, thereby preventing bubble generation in the die-casting product, as described above, and the contact surface of the die-casting product with the mold (core) can be made glossy, and thus a high-grade die-casting product having the desired strength can be obtained.

Sixth Embodiment

A laminated mold is manufactured and the mold is removed in the same first to fourth steps as in the first embodiment. In these steps, however, the water-soluble first inorganic salt powder is used as the water-soluble inorganic salt powder in the powder mixture. The water-soluble first inorganic salt powder is contained as the main component in the powder mixture, that is, in an amount exceeding 50% by weight, particularly preferably in an amount of 70% by weight or more. The spray liquid is used usually at room temperature, but may be heated. For example, when the spray liquid consists of the second inorganic salt and water, the spray liquid is heated preferably at 60° C. at maximum. When the spray liquid consists of the second inorganic salt, a water-miscible organic solvent and water, the spray liquid is heated preferably up to a temperature lower by about 10° C. than the boiling point of the water-miscible organic solvent. For example, when the water-miscible organic solvent is ethanol, the spray liquid is preferably heated at 60° C. at maximum.

When the water-miscible organic solvent is acetone, the spray liquid is preferably heated at 40° C. at maximum.

Then, the surface of the mold is sprayed with a first treatment composition containing a second inorganic salt having a melting point lower than that of the first inorganic salt and at least one liquid selected from water and a water-miscible organic solvent, or the mold is dipped in the first treatment composition, and the mold after either treatment is heated at a temperature at which the first inorganic salt is not fused but the second inorganic salt is fused, in an oxygen-containing atmosphere, for example, in an air atmosphere, whereby the final mold is produced. At this time, the water-soluble organic polymer in the mold is burned out (degreased).

The water-soluble first inorganic salt in the powder mixture and the second inorganic salt in the first treatment composition are used in, for example, the combinations described above in the third embodiment.

The first treatment composition is mainly in the form of a solution. The concentration of the second inorganic salt in the first treatment composition is preferably 0.1% by weight or more from the viewpoint of improving strength of a mold by the second inorganic salt. The upper limit of the concentration of the second inorganic salt in the first treatment composition is preferably the maximum concentration of the second inorganic salt that can be dissolved at room temperature in at least one selected from a water-miscible organic solvent and water. Particularly, the concentration of the second inorganic salt in the first treatment composition is preferably 0.1 to 25% by weight. However, the first treatment composition consisting of the second inorganic salt combined with the water-miscible organic solvent is sometimes in the form of a slurry in which the second inorganic salt is suspended without dissolution in the water-miscible organic solvent, depending on their types.

In the case of the combination where the first inorganic salt is sodium chloride and the second inorganic salt is potassium chloride, the heating is conducted preferably at a temperature of 400 to 750° C. in an oxygen-containing atmosphere, for example in an air atmosphere.

In the sixth embodiment, the surface of the mold subjected to spraying or the like with the first treatment solution and to heating may further be sprayed with a second treatment composition containing a third inorganic salt having a melting point lower than that of the first inorganic salt and at least one liquid selected from water and a water-miscible organic solvent, or the mold may be dipped in the second treatment composition, and the mold after either treatment may be heated at a temperature at which the first inorganic salt is not fused but at least one selected from the second and third inorganic salts is fused.

The second treatment composition is mainly in the form of a solution. The concentration of the third inorganic salt in the second treatment composition is preferably in the range of 0.1 to 25% by weight. However, the second treatment composition consisting of the third inorganic salt combined with the water-miscible organic solvent is sometimes in the form of a slurry in which the third inorganic salt is suspended without dissolution in the water-miscible organic solvent, depending on their types.

The third inorganic salt is selected from materials of the same type as, or of a different type from, that of the second inorganic salt. When the third inorganic salt is a material of a different type from the first and second inorganic salts, the combination of the first, second and third inorganic salts includes, for example, a combination wherein the first inorganic salt is sodium chloride (NaCl), the second inorganic salt is potassium chloride (KCl), and the third inorganic salt is sodium iodide (NaI) or calcium chloride ($CaCl_2$).

In dipping the mold into the second treatment composition, the second treatment composition on the surface of the mold is preferably 20 to 50 μm in thickness.

The "fusion" of at least one inorganic salt selected from the second inorganic salt and the third inorganic salt in the heating treatment means that when the second and third inorganic salts are of the same type, the inorganic salts are simply fused. When the third inorganic salt is a material of a type different from the second inorganic salt, the term "fusion" means (A) mere fusion of the second inorganic salt and/or the third inorganic salt, (B) formation of a solid solution of all of the second and third inorganic salts upon fusion, (C) formation of a solid solution of some of the second and third inorganic salts and simultaneous formation of a composite salt between the remaining inorganic salts upon fusion, and (D) formation of a composite salt of all the second and third inorganic salts upon fusion. By fusing at least one inorganic salt selected from the second and third inorganic salts in this way, it is possible to further improve the strength of the mold, in addition to an improvement in the surface smoothness of the mold.

When the third inorganic salt in the second treatment composition is potassium chloride (KCl) in a combination wherein the first inorganic salt in the mold is for example sodium chloride (NaCl) and the second inorganic salt in the first treatment composition subjected to spraying or the like is potassium chloride (KCl), the heating is conducted preferably at a temperature of 400 to 750° C. in an oxygen-containing atmosphere, for example in an air atmosphere. In the case of a combination wherein the first inorganic salt is NaCl, the second inorganic salt is KCl, and the third inorganic salt is NaI, the heating is conducted preferably at a temperature of 400 to 700° C. in an oxygen-containing atmosphere, for example in an air atmosphere.

According to the sixth embodiment described above, the following action and effect are demonstrated.

1) A powder mixture containing a water-soluble first inorganic salt powder and a water-soluble organic polymer powder is expanded in a plane on a table, and then the expanded powder mixture layer is sprayed selectively through a nozzle with a spray liquid containing at least one selected from a water-miscible organic solvent and water, whereby the water-soluble organic polymer powder as a component in the powder mixture is dissolved in water in the spray liquid, thus rendering the bonding strength among particles of the powder mixture in the sprayed region higher than that among particles of the powder mixture in the unsprayed region. Such expanding of the powder mixture and selective spraying of the spray liquid through a nozzle are repeated several times, whereby a mold of a desired shape shaped by the sprayed regions can be formed.

2) The water-soluble organic polymer powder incorporated into the powder mixture acts as a powder binder in the sprayed region, while the spray liquid is a composition containing at least one selected from a water-miscible organic solvent and water and being free of a binder component involved substantially in increasing viscosity, thereby preventing the clogging of a nozzle upon spraying the spray liquid onto the expanded powder mixture layer (by printing with, for example, a three-dimensional printer having a nozzle). As a result, the sprayed regions (slice regions for forming a mold) faithful to the section data into which the three-dimensional CAD data has been sliced can be formed in laminated mold manufacturing. In addition, there is no limitation, attributable to clogging, of the number of laminates in the laminated mold thus produced, and thus a larger mold can be manufactured.

Particularly, by using a spray liquid containing a water-miscible organic solvent, it is possible to suppress or prevent the blurring and diffusion of the sprayed region upon spraying the expanded powder mixture layer through a nozzle with the spray liquid, thus enabling formation of sprayed regions (slice regions for forming a mold) faithful to the section data into which the three-dimensional CAD data has been sliced.

3) The surface of the mold after taking out is sprayed with a first treatment composition containing a water-soluble second inorganic salt having a melting point lower than that of the first inorganic salt and at least one liquid selected from water and a water-miscible organic solvent, or the mold is dipped in the first treatment composition, and by either treatment, the surface of the mold is coated with the second inorganic salt in the first treatment composition. Thereafter, the mold is heated at a temperature at which the first inorganic salt is not fused but the second inorganic salt is fused, whereby the fused second inorganic salt permeates into minute voids in the first inorganic salt powder from the surface of the mold to make the mold dense. By fusing the second inorganic salt coated on the surface of the mold, the surface can be smoothened. As a result, a mold having a glossier surface than the mold just after removal can be obtained.

4) In demolding after casting with the mold as a core, the mold is composed mainly of the water-soluble first and second inorganic salts and can thus be easily removed with water.

According to the sixth embodiment, there can be provided a method for manufacturing a mold, wherein a mold having a smooth and glossy surface and practically durable strength and being faithful to three-dimensional CAD data can be produced reproducibly without clogging a nozzle in spraying the spray liquid and can be easily removed.

According to the sixth embodiment, the water-soluble organic polymer is burned out by heating the mold at a temperature at which the second inorganic salt is fused, and thus the resulting mold has a slightly lower strength than that of the mold having the remaining water-soluble organic polymer according to the first embodiment, but has the following effect.

That is, when such a mold wherein the water-soluble organic polymer has been burned out by the heating is applied to a core where a molten metal is cast at a temperature higher than the temperature at which the water-soluble organic polymer is burned out, for example, to a core for aluminum die-casting, the gas generation attributable to the water-soluble organic polymer can be prevented, as described in the third embodiment. As a result, bubble generation, etc. in the die-casting product, accompanying the gas generation, can be prevented, and the die-casting product having a desired strength can be obtained.

The surface of the mold after the heating is sprayed with a second treatment composition containing a third inorganic salt having a melting point lower than that of the first inorganic salt and at least one liquid selected from water and a water-miscible organic solvent, or the mold is dipped in the second treatment composition, and the mold after either treatment is heated at a temperature at which the first inorganic salt is not fused but at least one inorganic salt selected from the second and third inorganic salts is fused. By coating the surface of the mold with the third inorganic salt in the second treatment composition and subsequent heat treatment, the surface of the mold is smoothened by coating it with a thin film of the third inorganic salt. In addition, the mold is densified by fusing at least one of the second and third inorganic salts. Particularly, both the second and third inorganic salts can be fused to form a mutual solid solution or to form a composite salt, thus further densifying the mold and improving the strength thereof. As a result, a high-strength mold having a smoother and glossier surface can be obtained.

When such a mold having a smooth surface is applied to a core for aluminum die-casting, gas generation attributable to the water-soluble organic polymer can be avoided, thereby preventing bubble generation in the die-casting product, as described above, and the contact surface of the die-casting product with the mold (core) can be made glossy, and thus a high-grade die-casting product having a desired strength can be obtained.

Hereinafter, the present invention will be described in more detail with reference to Examples.

Example 1

Sodium chloride (NaCl) powder having an average particle size of 63 µm was compounded with 0.5 wt % polyvinyl pyrrolidone (PVP) powder having an average particle size of 117 µm to prepare a powder mixture.

Separately, ethanol (EtOH) and water were mixed in a weight ratio of 1:1 and compounded with a very small amount of a blue dye (edible blue No. 1) to prepare a spray liquid.

First, the powder mixture was expanded in a plane on a table, to form a powder mixture layer of about 0.18 mm in thickness. Using a three-dimensional printer having a nozzle, this mixed powder was then printed (sprayed through the nozzle) selectively with the above spray liquid at room temperature (20° C.), on the basis of the bottom (data on the lowest section) out of section data obtained by converting data on a rectangular mold of 5.2 mm in width, 14.1 mm in length and 5.2 mm in height prepared using a three-dimensional CAD, into data on sections each sliced in a thickness of about 0.18 mm. At this time, the bonding strength among particles of the powder mixture in the sprayed region (colored blue) of the powder mixture layer was made higher than that among particles of the powder mixture in the unsprayed region.

Then, the powder mixture was further expanded on the powder mixture layer after spraying, to form a powder mixture layer. Using the three-dimensional printer having a nozzle, this expanded powder mixture layer was then printed selectively (sprayed through the nozzle) with the spray liquid on the basis of the section data (data on an upper section next to the bottom). At this time, the bonding strength among particles of the powder mixture in the sprayed region (colored blue) in the powder mixture layer was made higher than that among particles of the powder mixture in the unsprayed region. Simultaneously, this sprayed region was bound to the lower sprayed region.

Then, such formation of a powder mixture layer and subsequent selective printing (nozzle spraying) of this powder mixture layer with the spray liquid by the three-dimensional printer were conducted repeatedly 31 times. By such laminated mold manufacturing, a rectangular mold shaped by the sprayed regions formed by spraying the spray liquid 31 times was formed. Subsequently, the mold was dried at 100° C. for 30 minutes and then a rectangular mold was manufactured by removing the powder mixture in the unsprayed region and taking out the mold.

In the same manner, 4 additional molds were produced, and 5 molds were obtained in total.

Example 2

Five rectangular molds were prepared in the same manner as in Example 1 except that a mixture prepared by compounding sodium chloride (NaCl) powder having the same average particle size as in Example 1 with 1 wt % PVP powder having the same average particle size as in Example 1 was used as the powder mixture. The same spray liquid as in Example 1, that is, a mixture prepared by mixing EtOH with water in a weight ratio of 1:1 and adding a very small amount of a blue dye (edible blue No. 1) thereto was used.

Example 3

Five rectangular molds were prepared in the same manner as in Example 1 except that a mixture prepared by compounding sodium chloride (NaCl) powder having the same average particle size as in Example 1 with 5.0 wt % PVP powder having the same average particle size as in Example 1 was used as the powder mixture. The same spray liquid as in Example 1, that is, a mixture prepared by mixing EtOH with water in a weight ratio of 1:1 and adding a very small amount of a blue dye (edible blue No. 1) thereto was used.

Example 4

Five rectangular molds were prepared in the same manner as in Example 1 except that a mixture prepared by compounding sodium chloride (NaCl) powder having the same average particle size as in Example 1 with 10 wt % PVP powder having the same average particle size as in Example 1 was used as the powder mixture. The same spray liquid as in Example 1, that is, a mixture prepared by mixing EtOH with water in a weight ratio of 1:1 and adding a very small amount of a blue dye (edible blue No. 1) thereto was used.

Example 5

Five rectangular molds were prepared in the same manner as in Example 1 except that a mixture prepared by compounding sodium chloride (NaCl) powder having the same average particle size as in Example 1 with 1 wt % PVP powder having the same average particle size as in Example 1 was used as the powder mixture, and a mixture prepared by mixing EtOH with water in a weight ratio of 1:2 and adding a very small amount of a blue dye (edible blue No. 1) thereto was used as the spray liquid.

Example 6

Five rectangular molds were prepared in the same manner as in Example 1 except that a mixture prepared by compounding sodium chloride (NaCl) powder having the same average particle size as in Example 1 with 10 wt % PVP powder having the same average particle size as in Example 1 was used as the powder mixture, and a mixture prepared by mixing EtOH with water in a weight ratio of 1:2 and adding a very small amount of a blue dye (edible blue No. 1) thereto was used as the spray liquid.

Example 7

Five rectangular molds were prepared in the same manner as in Example 1 except that a mixture prepared by compounding sodium chloride (NaCl) powder having the same average particle size as in Example 1 with 1 wt % PVP powder having the same average particle size as in Example 1 was used as the powder mixture, and water was used as the spray liquid.

Comparative Example 1

Five rectangular molds were prepared in the same manner as in Example 1 except that only sodium chloride (NaCl) powder having the same average particle size as in Example 1 was used as the powder to be expanded. The same spray liquid as in Example 1, that is, a mixture prepared by mixing EtOH with water in a weight ratio of 1:1 and adding a very small amount of a blue dye (edible blue No. 1) thereto was used.

Comparative Example 2

Five rectangular molds were prepared in the same manner as in Example 1 except that only sodium chloride (NaCl) powder having the same average particle size as in Example 1 was used as the powder to be expanded, and water containing a very small amount of a blue dye (edible blue No. 1) was used as the spray liquid.

The resulting rectangular molds in Examples 1 to 7 and Comparative Examples 1 and 2 were examined for their strength under the following conditions.

Measuring instrument: Particle strength measuring instrument (trade mane: Grano, manufactured by Okada Seiko Co., Ltd.)

Measurement conditions

Tip diameter of a chip pressed against the central part of the mold: 3 mm

Measurement speed of a chip: 100 μm/sec

Measurement range: 2 kg to 20 kg.

Measurement position: The tip of a chip was arranged to be positioned on the central part of the mold.

Evaluation method: The 5 molds were measured for their strength, and the mean strength of 3 molds, excluding 2 molds with the maximum and minimum values respectively, was determined.

Figure 2:
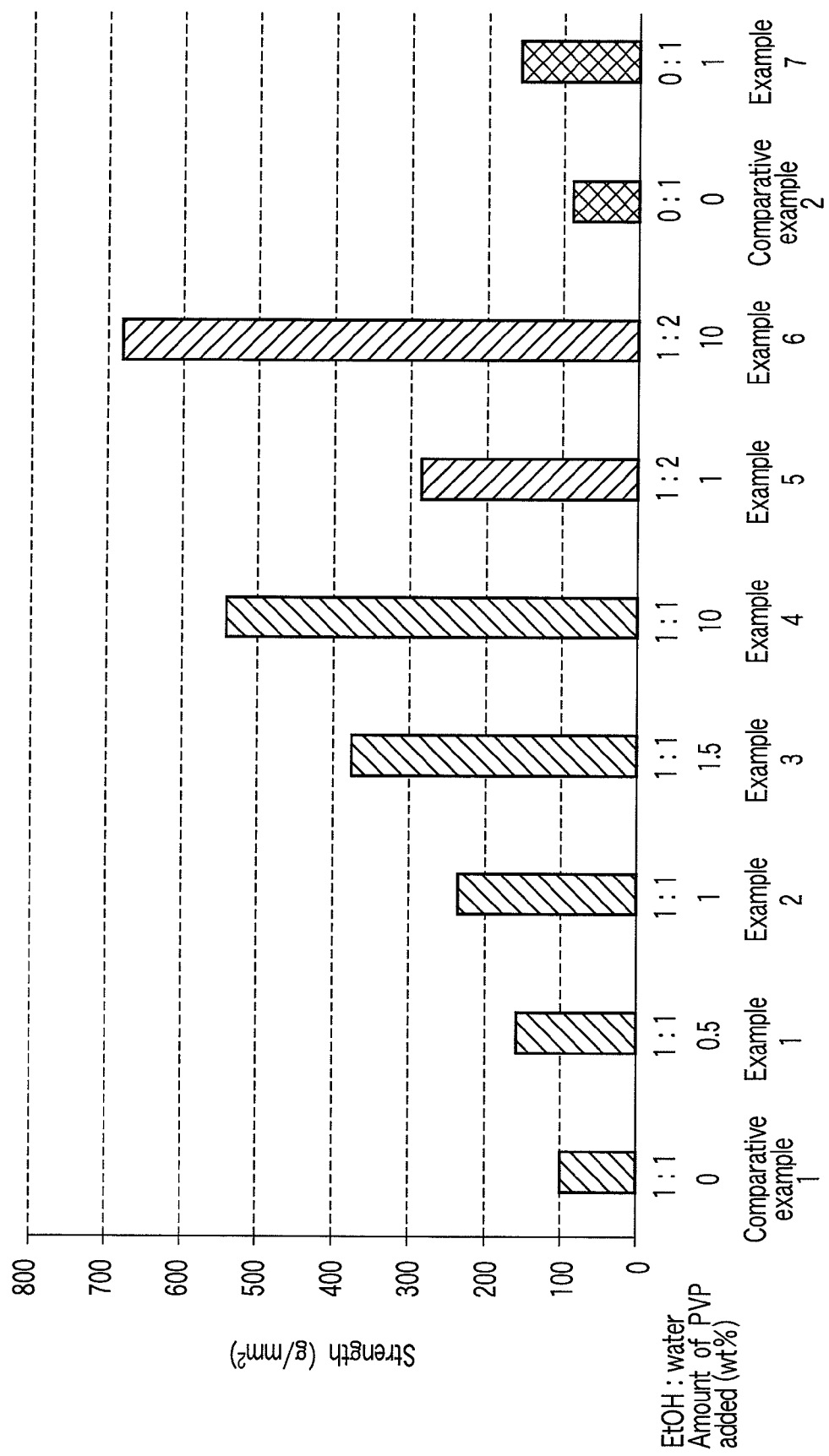
FIG. 2 is a graph showing the strengths of molds produced in Examples 1 to 7 and Comparative Examples 1 and 2 according to the invention.

The results in this strength test are shown in FIG. 2.

From FIG. 2, it can be seen that the molds in Examples 1 to 7 have higher strength than the mold in Comparative Example 1 wherein only NaCl powder not containing PVP powder was used as the expanded powder and the mold in Comparative Example 2 wherein only NaCl powder not containing PVP powder was used as the expanded powder and water was used as the spray liquid. It can be seen that particularly, the molds in Examples 2 to 6 wherein a powder mixture containing 1 wt % or more PVP powder was used as the expanded powder and a mixture of ethanol and water was used as the spray liquid, have a high strength of about 240 g/mm² or more.

With respect to the resulting rectangular molds in Examples 1 to 7 and Comparative Examples 1 and 2, their appearance was visually observed.

As a result, it was confirmed that the molds in Examples 1 to 7 have a clearer edge line than in the mold in Comparative Example 1 wherein only sodium chloride powder not containing PVP powder was used as the expanded powder and the mold in Comparative Example 2 wherein only sodium chloride powder not containing PVP powder was used as the expanded powder and water was used as the spray liquid. It was confirmed that particularly, the molds in Examples 2 to 6 wherein a powder mixture containing 1 wt % or more PVP powder was used as the expanded powder and a mixture of ethanol and water was used as the spray liquid, have a clearer edge line.

Example 8

Sodium chloride (NaCl) powder having an average particle size of 63 μm was compounded with 1.0 wt % polyvinyl pyrrolidone (PVP) powder having an average particle size of 117 μm to prepare a powder mixture.

Separately, ethanol and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

Example 9

Sodium chloride (NaCl) powder having an average particle size of 63 μm was compounded with 1.0 wt % polyvinyl pyrrolidone (PVP) powder having an average particle size of 117 μm to prepare a powder mixture.

Separately, acetone and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

Example 10

Sodium chloride (NaCl) powder having an average particle size of 63 μm was compounded with 1.0 wt % polyvinyl alcohol (PVA) powder having an average particle size of 117 μm to prepare a powder mixture.

Separately, ethanol and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

Example 11

Sodium chloride (NaCl) powder having an average particle size of 63 μm was compounded with 1.0 wt % carboxymethyl cellulose (CMC) powder having an average particle size of 117 μm to prepare a powder mixture.

Separately, ethanol and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

Example 12

Sodium chloride (NaCl) powder having an average particle size of 63 μm was compounded with 1.0 wt % hydroxypropyl cellulose (HPC) powder having an average particle size of 117 μm to prepare a powder mixture.

Separately, ethanol and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

With respect to the resulting rectangular molds in Examples 8 to 12, their appearance was visually observed. As a result, it was confirmed that the molds in Examples 8 to 12 have a clearer edge line than in the mold in Comparative Example 1 wherein only sodium chloride powder not containing a water-soluble organic polymer resin powder such as PVP powder was used as the expanded powder and the mold in Comparative Example 2 wherein only sodium chloride powder not containing a water-soluble organic polymer resin powder was used as the expanded powder and water was used as the spray liquid.

The resulting rectangular molds in Examples 8 to 12 were examined in the strength test under the same conditions as described above, and the mean strength of 3 molds, excluding 2 molds with the maximum and minimum values respectively, was determined. The results are shown in Table 1 below.

TABLE 1

| | Powder mixture | | | |
| --- | --- | --- | --- | --- |
| | Inorganic salt | Organic polymer | Organic solvent in spray liquid | Strength (g/mm$^2$) |
| Example 8 | NaCl | PVP | Ethanol | 240 |
| Example 9 | NaCl | PVP | Acetone | 255 |
| Example 10 | NaCl | PVA | Ethanol | 148 |
| Example 11 | NaCl | CMC | Ethanol | 155 |
| Example 12 | NaCl | HPC | Ethanol | 180 |

From Table 1 above, it can be seen that the molds in Examples 8 to 12 have higher strength than the mold in Comparative Example 1 wherein only sodium chloride powder not containing a water-soluble organic polymer resin powder such as PVP powder was used as the expanded powder shown in FIG. 1 and the mold in Comparative Example 2 wherein only sodium chloride powder not containing a water-soluble organic polymer resin powder was used as the expanded powder and water was used as the spray liquid. It can be seen that, particularly, the molds in Examples 8 and 9 wherein PVP powder was used as the water-soluble organic polymer resin powder in the expanded powder have a higher strength than in the molds in Examples 12 to 14 wherein a water-soluble organic polymer resin powder such as CMC powder was used.

Example 13-1

A mixture (NaCl:MgSO$_4$ weight ratio=95:5) of sodium chloride (NaCl) powder having an average particle size of 63 μm and magnesium sulfate (MgSO$_4$) powder having an average particle size of 50 μm was compounded with 2.0 wt % polyvinyl pyrrolidone (PVP) powder having an average particle size of 117 μm to prepare a powder mixture.

Separately, ethanol (EtOH) and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

Then, the resulting molds were subjected to heat treatment at 700° C. for 30 minutes in air to prepare final molds.

Example 13-2

Sodium iodide (NaI) was dissolved in an amount of 10% by weight in ethanol to prepare a dipping treatment solution. The respective molds obtained in Example 13-1 were dipped in this dipping treatment solution for 2 minutes, then removed from the dipping treatment solution, and subjected respectively to heat treatment at 700° C. for 30 minutes in air.

With respect to the resulting rectangular molds in Examples 13-1 and 13-2, their appearance was visually observed. As a result, it was confirmed that the molds in both the Examples have a sharp shape with a clearer edge line than in the molds in Examples 8 to 12.

With respect to the resulting rectangular molds in Examples 13-1 and 13-2, their surface state was visually observed. As a result, it was confirmed that the molds in Example 13-1 have a slightly rough surface, but the molds in Examples 13-2 have a smooth surface.

The resulting rectangular molds in Examples 13-1 and 13-2 were examined in the strength test under the same conditions as described above, and the mean strength of 3 molds, excluding 2 molds with the maximum and minimum values respectively, was determined. As a result, the molds in Example 13-1 had a strength of 190 g/mm$^2$, and the molds in Example 13-2 had a strength of 220 g/mm$^2$.

When such a mold in Example 13-1 is applied to a core where a molten metal is cast at a temperature higher than the temperature at which PVP is burned out, for example, to a core for aluminum die-casting, gas generation attributable to PVP can be avoided, thereby preventing bubble generation, etc. in the die-casting product, and thus a die-casting product having desired strength can be obtained.

When such a mold having a smooth surface in Example 13-2 is applied to a core for aluminum die-casting, gas generation attributable to PVP can be avoided, thereby preventing bubble generation, etc. in the die-casting product, and the contact surface of a die-casting product with the mold (core) can be made glossy, and thus a high-grade die-casting product having desired strength can be obtained.

Example 14-1

A mixture (NaCl:KCl weight ratio=95:5) of sodium chloride (NaCl) powder having an average particle size of 63 μm and potassium chloride (KCl) powder having an average particle size of 63 μm was compounded with 2.0 wt % polyvinyl pyrrolidone (PVP) powder having an average particle size of 117 μm to prepare a powder mixture.

Separately, ethanol (EtOH) and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

Then, the resulting molds were subjected to heating at 700° C. for 30 minutes in air to manufacture final molds.

Example 14-2

Sodium iodide (NaI) was dissolved in an amount of 10% by weight in ethanol to prepare a dipping treatment solution. The respective molds obtained in Example 14-1 were dipped in this dipping treatment solution for 2 minutes, then taken out from the dipping treatment solution, and subjected respectively to heating at 700° C. for 30 minutes in air.

Example 15-1

Sodium chloride (NaCl) powder having an average particle size of 63 μm was compounded with 2.0 wt % polyvinyl pyrrolidone (PVP) powder having an average particle size of 117 μm to prepare a powder mixture.

Separately, potassium chloride (KCl) was dissolved in an amount of 5 wt % in a mixture prepared by mixing ethanol (EtOH) with water in a weight ratio of 1:1, followed by adding a very small amount of a blue dye (edible blue No. 1) thereto, to prepare a spray liquid.

The powder mixture and the spray liquid were used to produce 5 rectangular molds in the same manner as in Example 1.

Then, the resulting molds were subjected to heating at 700° C. for 30 minutes in air to manufacture final molds.

Example 15-2

Sodium iodide (NaI) was dissolved in an amount of 10% by weight in ethanol to prepare a dipping treatment solution. The respective molds obtained in Example 15-1 were dipped in this dipping treatment solution for 2 minutes, then taken out from the dipping treatment solution, and subjected respectively to heating at 700° C. for 30 minutes in air.

Example 16-1

Sodium chloride (NaCl) powder having an average particle size of 63 μm was compounded with 2.0 wt % polyvinyl pyrrolidone (PVP) powder having an average particle size of 117 μm to prepare a powder mixture.

Separately, sodium iodide (NaI) was dissolved in an amount of 10% by weight in ethanol (EtOH), followed by adding a very small amount of a blue dye (edible blue No. 1) thereto, to prepare a spray liquid.

The powder mixture and the spray liquid were used to produce 5 rectangular molds in the same manner as in Example 1.

Then, the resulting molds were subjected to heating at 700° C. for 30 minutes in air to manufacture final molds.

Example 16-2

Calcium chloride (CaCl$_2$) was dissolved in an amount of 5% by weight in ethanol to prepare a dipping treatment solution. The respective molds obtained in Example 16-1 were dipped in this dipping treatment solution for 2 minutes, then taken out from the dipping treatment solution, and subjected respectively to heating at 700° C. for 30 minutes in the air.

Example 17-1

Magnesium sulfate (MgSO$_4$) powder having an average particle size of 50 μm was compounded with 2.0 wt % polyvinyl pyrrolidone (PVP) powder having an average particle size of 117 μm to prepare a powder mixture.

Separately, calcium chloride (CaCl$_2$) was dissolved in an amount of 5% by weight in ethanol (EtOH), followed by adding a very small amount of a blue dye (edible blue No. 1) thereto, to prepare a spray liquid.

The powder mixture and the spray liquid were used to produce 5 rectangular molds in the same manner as in Example 1.

Then, the resulting molds were subjected to heating at 700° C. for 30 minutes in air to manufacture final molds.

Example 17-2

Sodium iodide (NaI) was dissolved in an amount of 5% by weight in ethanol to prepare a dipping treatment solution. The respective molds obtained in Example 17-1 were dipped in this dipping treatment solution for 2 minutes, then taken out from the dipping treatment solution, and subjected respectively to heating at 700° C. for 30 minutes in air.

Example 18-1

Sodium chloride (NaCl) powder having an average particle size of 63 μm was compounded with 2.0 wt % polyvinyl pyrrolidone (PVP) powder having an average particle size of 117 μm to prepare a powder mixture.

Separately, ethanol (EtOH) and water were mixed in a weight ratio of 1:1 and compounded with a very small amount of a blue dye (edible blue No. 1) to prepare a spray liquid.

The powder mixture and the spray liquid were used to produce 5 rectangular molds in the same manner as in Example 1.

A spray treatment solution was previously prepared by dissolving potassium chloride (KCl) in an amount of 5% by weight in a mixture having ethanol (EtOH) and water mixed in a weight ratio of 1:1, and this spray treatment solution was sprayed onto the surfaces of the respective molds which were then subjected to heating at 700° C. for 30 minutes in air to manufacture final molds.

Example 18-2

Sodium iodide (NaI) was dissolved in an amount of 10% by weight in ethanol to prepare a dipping treatment solution. The respective molds obtained in Example 18-1 were dipped in this dipping treatment solution for 2 minutes, then taken out from the dipping treatment solution, and subjected respectively to heating at 700° C. for 30 minutes in air.

With respect to the resulting rectangular molds in Examples 14-1, 14-2, 15-1, 15-2, 16-1, 16-2, 17-1, 17-2, 18-1 and 18-2, their appearance was visually observed. As a result, it was confirmed that the molds in any of the Examples have a clearer edge line than in the mold in Comparative Example 1 wherein only sodium chloride powder not containing a water-soluble organic polymer resin powder such as PVP powder was used as the expanded powder and the mold in Comparative Example 2 wherein only sodium chloride powder not containing a water-soluble organic polymer resin powder was used as the expanded powder and water was used as the spray liquid.

With respect to the resulting rectangular molds in Examples 14-1, 14-2, 15-1, 15-2, 16-1, 16-2, 17-1, 17-2, 18-1 and 18-2, their surface state was visually observed. The results are shown in Table 2 below.

With respect to the resulting rectangular molds in Examples 14-1, 14-2, 15-1, 15-2, 16-1, 16-2, 17-1, 17-2, 18-1 and 18-2, the strength test was carried out under the same conditions as described above, and the mean strength of 3 molds, excluding 2 molds with the maximum and minimum values respectively, was determined. The results are shown in Table 2 below.

TABLE 2

| | Powder mixture | | Spray liquid | | Inorganic salt in spray treatment solution | Inorganic salt in dipping treatment solution | Surface state | Strength (g/mm$^2$) |
|---|---|---|---|---|---|---|---|---|
| | Inorganic salt | Organic polymer | Inorganic salt | Solution | | | | |
| Example 14-1 | NaCl/KCl | PVP | — | EtOH 50 wt % | — | — | Slightly rough | 130 |
| Example 14-2 | NaCl/KCl | PVP | — | EtOH 50 wt % | — | NaI | Smooth | 215 |
| Example 15-1 | NaCl | PVP | KCl | EtOH 50 wt % | — | — | Slightly rough | 100 |
| Example 15-2 | NaCl | PVP | KCl | EtOH 50 wt % | — | NaI | Smooth | 170 |
| Example 16-1 | NaCl | PVP | NaI | EtOH 100 wt % | — | — | Slightly rough | 200 |
| Example 16-2 | NaCl | PVP | NaI | EtOH 100 wt % | — | CaCl$_2$ | Smooth | 230 |
| Example 17-1 | MgSO$_4$ | PVP | CaCl$_2$ | EtOH 100 wt % | — | — | Slightly rough | 85 |
| Example 17-2 | MgSO$_4$ | PVP | CaCl$_2$ | EtOH 100 wt % | — | NaI | Smooth | 134 |
| Example 18-1 | NaCl | PVP | — | EtOH 50 wt % | KCl | — | Slightly rough | 99 |
| Example 18-2 | NaCl | PVP | — | EtOH 50 wt % | KCl | NaI | Smooth | 168 |

As is evident from Table 2 above, the molds in Examples 14-1, 15-1, 16-1, 17-1 and 18-1, have burned out PVP due to the heat treatment and are thus slightly inferior in strength to the molds in Examples 8 to 12 (with an organic polymer such as PVP remaining therein), but have a practically durable strength. In addition, when such mold is applied to a core where a molten metal is cast at a temperature higher than the temperature at which PVP is burned out, for example, to a core for aluminum die-casting, the gas generation attributable to PVP can be avoided, thereby preventing bubble generation, etc. in the die-casting product, and thus a die-casting product having a desired strength can be obtained.

It can also be seen that the molds in Examples 14-2, 15-2, 16-2, 17-2 and 18-2 wherein the molds have been subjected to dipping in a dipping treatment solution having an inorganic salt dissolved therein and further to heating, have improved not only surface smoothness but also strength, as compared with the molds in Examples 14-1, 15-1, 16-1, 17-1 and 18-1 wherein the molds are not subjected to such treatment. When such a mold having a smooth surface is applied to a core for aluminum die-casting, gas generation attributable to PVP can be avoided, thereby preventing bubble generation, etc. in the die-casting product, and the contact surface of the die-casting product with the mold (core) can be made glossy, and thus a high-grade die-casting product having a desired strength can be obtained.

INDUSTRIAL APPLICABILITY

According to the present invention, there can be provided a method for manufacturing a mold, wherein a mold having a complicated shape and sufficient strength useful for a core, etc. used in casting can be produced easily, safely and accurately.

According to the present invention, there can further be provided a method for manufacturing a mold, wherein a mold having a complicated shape, high strength and a smooth surface useful for a core, etc. used in casting can be produced easily, safely and accurately.

The invention claimed is:

1. A method for manufacturing a mold, comprising steps of:
    (a) expanding a powder mixture containing a water-soluble first inorganic salt powder, a second inorganic salt powder consisting of magnesium sulfate, and at least one water-soluble organic polymer powder selected from polgvinyl pyrrolidone, polyvinyl alcohol, polyethylene glycol, methyl cellulose, ethyl cellulose, ethylhydroxymethyl cellulose, carboxymethyl cellulose (CMC), hydroxypropyl cellulose (HPC) and hydroxypropylmethyl cellulose (HPMC) in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region;
    (b) further expanding the powder mixture on the powder mixture layer after spraying and then selectively spraying the spray liquid through the nozzle on this powder mixture layer;
    (c) repeatedly conducting the step (b) over several times to form a mold shaped by the sprayed regions;
    (d) taking out the mold; and
    (e) heating the mold at a temperature between the temperature at which the water-soluble organic polymer is burned out and the temperature at which the first and second inorganic salts are not fused, wherein a surface of the mold after the step (e) is further sprayed with a treatment composition containing a third inorganic salt having a melting point lower than those of the first and second inorganic salts and at least one liquid selected from water and a water-miscible organic solvent, or the mold is dipped in the treatment composition, and the mold after either treatment is heated at a temperature at which the first and second inorganic salts are not fused but the third inorganic salt is fused.

2. A method for manufacturing a mold, comprising steps of:
    a) expanding a powder mixture containing a water-soluble first inorganic salt powder, a water-soluble second inorganic salt powder having a melting point lower than that of the first inorganic salt, and at least one water-soluble organic polymer powder selected from polyvinyl pyrrolidone, polyvinyl alcohol, polyethylene glycol, methyl cellulose, ethyl cellulose, ethylhydroxymethyl cellulose, carboxymethyl cellulose (CMC), hydroxypropyl cellulose (HPC) and hydroxypropylmethyl cellulose (HPMC) in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region;
    b) further expanding the powder mixture on the powder mixture layer after spraying and then selectively spraying the spray liquid through the nozzle on this powder mixture layer;
    c) repeatedly conducting the step (b) over several times to form a mold shaped by the sprayed regions;
    d) taking out the mold; and
    e) heating the mold at a temperature at which the first inorganic salt is not fused but the second inorganic salt is fused, wherein a surface of the mold after the step (e) is further sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused.

3. A method for manufacturing a mold, comprising steps of:
    a) expanding a powder mixture containing a water-soluble first inorganic salt powder and a water-soluble organic polymer powder in a plane on a table and then selectively spraying a spray liquid containing a second inorganic salt having a melting point lower than that of the first inorganic salt, and either water or water and a water-miscible organic solvent through a nozzle on this powder mixture layer to make a bonding strength among particles of the powder mixture in a sprayed region higher than that among particles of the powder mixture in an unsprayed region;
    b) further expanding the powder mixture on the powder mixture layer after spraying and then selectively spraying the spray liquid through the nozzle on this powder mixture layer;
    c) repeatedly conducting the step (b) over several times to form a mold shaped by the sprayed regions;
    d) taking out the mold; and
    e) heating the mold at a temperature at which the first inorganic salt is not fused but the second inorganic salt is fused.

4. The method for manufacturing a mold according to claim 3, wherein the first inorganic salt is sodium chloride, and the second inorganic salt is potassium chloride.

5. The method for manufacturing a mold according to claim 3, wherein the water-soluble organic polymer is at least one member selected from polyvinyl pyrrolidone, polyvinyl alcohol, polyethylene glycol and a cellulose derivative.

6. The method for manufacturing a mold according to claim 3, wherein the water-miscible organic solvent is a lower alcohol or a ketone.

7. The method for manufacturing a mold according to claim 3, wherein drying treatment is further conducted after the step (c) and before the step (d).

8. The method for manufacturing a mold according to claim 3, wherein a surface of the mold after the step (e) is further sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused.

9. A method for manufacturing a mold, comprising steps of:
    a) expanding a powder mixture containing a water-soluble first inorganic salt powder and an organic polymer powder in a plane on a table and then selectively spraying a spray liquid containing at least one second inorganic salt having a melting point lower than that of the first inorganic salt and selected from calcium chloride and sodium iodide and at least one organic solvent selected from a lower alcohol and a ketone through a nozzle on this powder mixture layer to make a bonding strength among particles of the powder mixture in a sprayed region higher than that among particles of the powder mixture in an unsprayed region;

b) further expanding the powder mixture on the powder mixture layer after spraying and then selectively spraying the spray liquid through the nozzle on this powder mixture layer;

c) repeatedly conducting the step (b) over several times to form a mold shaped by the sprayed regions;

d) taking out the mold; and e) heating the mold at a temperature at which the first inorganic salt is not fused but the second inorganic salt is fused.

10. The method for manufacturing a mold according to claim 9, wherein the first inorganic salt is sodium chloride, sodium bromide, potassium chloride, potassium bromide, magnesium chloride or magnesium sulfate.

11. The method for manufacturing a mold according to claim 9, wherein the organic polymer is at least one member selected from polyvinyl pyrrolidone, polyvinyl alcohol, polyethylene glycol and a cellulose derivative.

12. The method for manufacturing a mold according to claim 9, wherein drying treatment is further conducted after the step (c) and before the step (d).

13. The method for manufacturing a mold according to claim 9, wherein a surface of the mold after the step (e) is further sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused.

14. A method for manufacturing a mold, comprising steps of:

a) expanding a powder mixture containing a water-soluble first inorganic salt powder and a water-soluble organic polymer powder in a plane on a table and then selectively spraying a spray liquid containing at least one selected from a water-miscible organic solvent and water through a nozzle on this powder mixture layer to make a bonding strength among particles of the powder mixture in a sprayed region higher than that among particles of the powder mixture in an unsprayed region;

b) further expanding the powder mixture on the powder mixture layer after spraying and then selectively spraying the spray liquid through the nozzle on this powder mixture layer;

c) repeatedly conducting the step (b) over several times to form a mold shaped by the sprayed regions;

d) taking out the mold; and e) further spraying a treatment composition containing a water-soluble second inorganic salt having a melting point lower than that of the first inorganic salt and at least one liquid selected from water and a water-miscible organic solvent on a surface of the mold, or dipping the mold in the treatment composition, and then heating the mold after either treatment at a temperature at which the first inorganic salt is not fused but the second inorganic salt is fused.

15. The method for manufacturing a mold according to claim 14, wherein the first inorganic salt is sodium chloride, and the second inorganic salt is potassium chloride.

16. The method for manufacturing a mold according to claim 14, wherein the water-soluble organic polymer is at least one member selected from polyvinyl pyrrolidone, polyvinyl alcohol, polyethylene glycol and a cellulose derivative.

17. The method for manufacturing a mold according to claim 14, wherein the water-miscible organic solvent is a lower alcohol or a ketone.

18. The method for manufacturing a mold according to claim 14, wherein drying treatment is further conducted after the step (c) and before the step (d).

19. The method for manufacturing a mold according to claim 14, wherein the surface of the mold after the step (e) is further sprayed with a treatment composition containing a third inorganic salt having a melting point lower than that of the first inorganic salt and at least one liquid selected from water and a water-miscible organic solvent, or the mold is dipped in the treatment composition, and the mold after either treatment is heat-treated at a temperature at which the first inorganic salt is not fused but at least one inorganic salt selected from the second and third inorganic salts is fused.

* * * * *